United States Patent
Todorovic et al.

(10) Patent No.: US 12,321,879 B2
(45) Date of Patent: Jun. 3, 2025

(54) INTEGRITY-AND-VOLUME TESTING IN AN UNSECURED LOAN-LENDING SYSTEM INCLUDING METHODS THEREOF

(71) Applicant: loanDepot.COM, LLC, Foothill Ranch, CA (US)

(72) Inventors: Maja Todorovic, Irvine, CA (US); Eileen Kim, Laguna Niguel, CA (US); Dominick Edilio Marchetti, Dove Canyon, CA (US)

(73) Assignee: loanDepot.com, LLC, Irvine, CA (US)

(*) Notice: Subject to any disclaimer, the term of this patent is extended or adjusted under 35 U.S.C. 154(b) by 64 days.

(21) Appl. No.: 16/885,159

(22) Filed: May 27, 2020

(65) Prior Publication Data

US 2021/0012265 A1  Jan. 14, 2021

Related U.S. Application Data

(60) Provisional application No. 62/853,640, filed on May 28, 2019.

(51) Int. Cl.
G06Q 10/0639 (2023.01)
G06F 21/62 (2013.01)
(Continued)

(52) U.S. Cl.
CPC ... *G06Q 10/06395* (2013.01); *G06F 21/6245* (2013.01); *G06Q 10/10* (2013.01); *G06Q 40/03* (2023.01); *G06F 2221/2143* (2013.01)

(58) Field of Classification Search
None
See application file for complete search history.

(56) References Cited

U.S. PATENT DOCUMENTS 6,112,190 A * 8/2000 Fletcher ............... G06Q 40/06
                                                    706/50
6,567,814 B1 * 5/2003 Bankier ............ G06F 16/2465
(Continued)

OTHER PUBLICATIONS

Collins, M. Cary, and Frank M. Guess. "Improving Information Quality in Loan Approval Processes for Fair Lending and Fair Pricing." IQ. 2000 (Year: 2000).*

(Continued)

*Primary Examiner* — Darlene Garcia-Guerra
(74) *Attorney, Agent, or Firm* — Rutan & Tucker LLP; Ravi Mohan; Hani Z. Sayed

(57) ABSTRACT

Disclosed herein is an integrity-and-volume testing system for an unsecured loan-lending system. The integrity-and-volume testing system includes, in some embodiments, a data-preparation module, a quality-assurance framework, and a development version of the unsecured loan-lending system. The data-preparation module is configured to prepare sample loan-application input values for borrower-related information and loan-product information. The quality-assurance framework is configured to generate sample loan applications from the sample loan-application input values, as well as validate processed sample loan applications against processed-as-expected loan applications. The development version of the unsecured loan-lending system is configured to process the sample loan applications into the processed sample loan applications for validation against the processed-as-expected loan applications. Also disclosed herein is a method of the integrity-and-volume testing system for the unsecured loan-lending system.

8 Claims, 17 Drawing Sheets

(51) Int. Cl.
*G06Q 10/10* (2023.01)
*G06Q 40/03* (2023.01)

(56) References Cited

U.S. PATENT DOCUMENTS

| | | | | |
|---|---|---|---|---|
| 7,472,089 B2* | 12/2008 | Hu | ............... | G06Q 40/025 705/38 |
| 7,653,592 B1* | 1/2010 | Flaxman | ............... | G06Q 40/02 705/37 |
| 7,849,003 B2* | 12/2010 | Egnatios | ............... | G06Q 40/00 705/38 |
| 8,423,450 B2* | 4/2013 | Oppenheimer | ............... | G06Q 40/03 705/37 |
| 8,843,939 B2* | 9/2014 | Lesandro | ............... | G06Q 40/02 717/177 |
| 10,963,958 B1* | 3/2021 | Best | ............... | H04L 67/10 |
| 2004/0030649 A1* | 2/2004 | Nelson | ............... | G06Q 20/40 705/44 |
| 2005/0027651 A1* | 2/2005 | DeVault | ............... | G06Q 20/10 705/38 |
| 2005/0203830 A1* | 9/2005 | Prieston | ............... | G06Q 40/03 705/38 |
| 2005/0262194 A1* | 11/2005 | Mamou | ............... | G06Q 10/10 709/203 |
| 2009/0013259 A1* | 1/2009 | Teichman | ............... | G06N 5/04 715/738 |
| 2009/0024432 A1* | 1/2009 | Bauters | ............... | G06Q 10/063114 705/7.26 |
| 2010/0241558 A1* | 9/2010 | Chmielewski | ............... | G06Q 40/00 705/38 |
| 2011/0270779 A1* | 11/2011 | Showalter | ............... | G06Q 40/02 705/36 R |
| 2012/0072336 A1* | 3/2012 | Le Vine | ............... | G06Q 40/025 705/38 |
| 2012/0136776 A1* | 5/2012 | Haberaecker | ............... | G06Q 40/12 705/38 |
| 2013/0085925 A1* | 4/2013 | Simpson | ............... | G06Q 40/025 705/38 |
| 2014/0012724 A1* | 1/2014 | O'Leary | ............... | G06Q 20/4016 705/35 |
| 2014/0067650 A1* | 3/2014 | Gardiner | ............... | G06Q 40/03 705/38 |
| 2014/0089168 A1* | 3/2014 | Metz-Galloway | ... | G06Q 40/025 705/38 |
| 2014/0143126 A1* | 5/2014 | Malik | ............... | G06Q 40/03 705/38 |
| 2014/0358765 A1* | 12/2014 | Agius | ............... | G06Q 40/03 705/38 |
| 2016/0071208 A1* | 3/2016 | Straub | ............... | G06Q 50/265 705/38 |
| 2016/0189293 A1* | 6/2016 | Christiansen | ............... | G06Q 40/025 705/38 |
| 2016/0232546 A1* | 8/2016 | Ranft | ............... | G06Q 30/0206 |
| 2016/0328794 A1* | 11/2016 | Schrump | ............... | H04L 63/08 |
| 2018/0189680 A1* | 7/2018 | Gupta | ............... | G06N 5/025 |
| 2018/0204280 A1* | 7/2018 | Painter | ............... | G06F 16/252 |
| 2019/0043070 A1* | 2/2019 | Merrill | ............... | G06N 5/04 |
| 2019/0095991 A1* | 3/2019 | Swaminathan | ............... | G06Q 50/167 |
| 2019/0236134 A1* | 8/2019 | Galitsky | ............... | G06F 40/35 |
| 2019/0318122 A1* | 10/2019 | Hockey | ............... | H04L 63/102 |
| 2020/0074546 A1* | 3/2020 | Coulter | ............... | G06Q 20/102 |
| 2020/0134716 A1* | 4/2020 | Lahrichi | ............... | G06N 5/01 |
| 2020/0193513 A1* | 6/2020 | Ranney | ............... | G06Q 20/24 |
| 2020/0265512 A1* | 8/2020 | James | ............... | G06N 20/20 |
| 2020/0279140 A1* | 9/2020 | Pai | ............... | G06F 11/302 |

OTHER PUBLICATIONS

Talebzadeh, Houman, Sanda Mandutianu, and Christian F. Winner. "Countrywide loan-underwriting expert system." AI magazine 16.1 (1995): 51-51. (Year: 1995).*

Malhotra, Rashmi, and Davinder K. Malhotra. "Evaluating Consumer Loans Using Neural Networks." Omega 31.2 (2003): 83-9 (Year: 2003).*

Xiao, Guorong. "Data Processing Model of Bank Credit Evaluation System." J. Softw. 6.7 (2011): 1241-1247. (Year: 2011).*

C. Bryant, Kay. "ALEES: an agricultural loan evaluation expert system." Expert systems with applications 21.2 (2001): 75-85 (Year: 2001).*

Sachan, Swati, et al. "An explainable AI decision-support-system to automate loan underwriting." Expert Systems with Applications 144 (2020): 113100 (Year: 2020).*

Papouskova, Monika, and Petr Hajek. "Two-stage consumer credit risk modelling using heterogeneous ensemble learning." Decision support systems 118 (2019): 33-45 (Year: 2019).*

* cited by examiner

INTEGRITY-AND-VOLUME TESTING IN AN UNSECURED LOAN-LENDING SYSTEM INCLUDING METHODS THEREOF

PRIORITY

This application claims the benefit of priority to U.S. Provisional Patent Application No. 62/853,640, filed May 28, 2019, which is incorporated by reference in its entirety into this application.

BACKGROUND

An important financial service provided by financial institutions is lending, which can include originating loans, servicing loans, or both originating and serving loans. There are many different types of loans available through such financial institutions. Broadly, the different types of loans are divided between secured loans and unsecured loans, wherein the secured loans are secured against borrowers' assets. Secured loans include, for example, mortgages, home equity loans, home equity lines of credit, or automotive loans. Unsecured loans include, for example, personal loans, personal lines of credit, student loans, or credit cards.

Lending, particularly originating loans such as unsecured loans, requires many fragmented, often manual processes of both borrowers and lenders. For a borrower, such processes include filling out a loan application and providing information in support of the loan application, the supporting information including, for example, employment, income, and liability information. For a lender, such processes include processing the borrower's loan application and verifying the supporting information, underwriting a potential loan and performing a detailed risk assessment in view of the supporting information, and, ultimately, upon approval from underwriting, funding the loan. Moreover, such processes are highly specific to loan type. This obviates any financial benefit from economies of scale that could otherwise be passed onto borrowers and lenders alike if such processes were more tightly integrated. Accordingly, there is a need for a more highly automated, more tightly integrated, configurable lending platform that facilitates lending for at least unsecured loans.

Disclosed herein is an integrity-and-volume testing system for an unsecured loan-lending system and methods thereof in support of at least the foregoing need.

SUMMARY

Disclosed herein is an integrity-and-volume testing system for an unsecured loan-lending system. The integrity-and-volume testing system includes, in some embodiments, a data-preparation module, a quality-assurance framework, and a development version of the unsecured loan-lending system. The data-preparation module is configured to prepare sample loan-application input values for borrower-related information and loan-product information. The quality-assurance framework is configured to generate sample loan applications from the sample loan-application input values, as well as validate processed sample loan applications against processed-as-expected loan applications. The development version of the unsecured loan-lending system is configured to process the sample loan applications into the processed sample loan applications for validation against the processed-as-expected loan applications.

In some embodiments, the data-preparation module includes a data-scrubbing module configured to scrub at least the borrower-related information of the sample loan-application input values.

In some embodiments, the quality-assurance framework includes a test-processing module configured to generate the sample loan applications from the sample loan-application input values.

In some embodiments, the quality-assurance framework includes a validation module configured to validate the processed sample loan applications against the processed-as-expected loan applications.

In some embodiments, the quality-assurance framework includes a validation-report module configured to provide validation reports for the processed sample loan applications validated against the processed-as-expected loan applications.

Also disclosed herein is a method of an integrity-and-volume testing system for an unsecured loan-lending system. The method includes, in some embodiments, preparing sample loan-application input values for borrower-related information and loan-product information with a data-preparation module of the integrity-and-volume testing system; generating sample loan applications from the sample loan-application input values with a quality-assurance framework of the integrity-and-volume testing system; processing the sample loan applications into processed sample loan applications with a development version of the unsecured loan-lending system; and validating with the quality-assurance framework the processed sample loan applications against processed-as-expected loan applications generated from the sample loan-application input values.

In some embodiments, the method further includes scrubbing at least the borrower-related information of the sample loan-application input values with a data-scrubbing module of the data-preparation module.

In some embodiments, the method further includes generating the sample loan applications from the sample loan-application input values with a test-processing module of the quality-assurance framework.

In some embodiments, the method further includes validating the processed sample loan applications against the processed-as-expected loan applications with a validation module of the quality-assurance framework.

In some embodiments, the method further includes providing validation reports for the processed sample loan applications validated against the processed-as-expected loan applications a validation-report module of the quality-assurance framework.

These and other features of the concepts provided herein will become more apparent to those of skill in the art in view of the accompanying drawings and following description, which disclose particular embodiments of such concepts in greater detail.

DRAWINGS

DESCRIPTION

Figure 1:
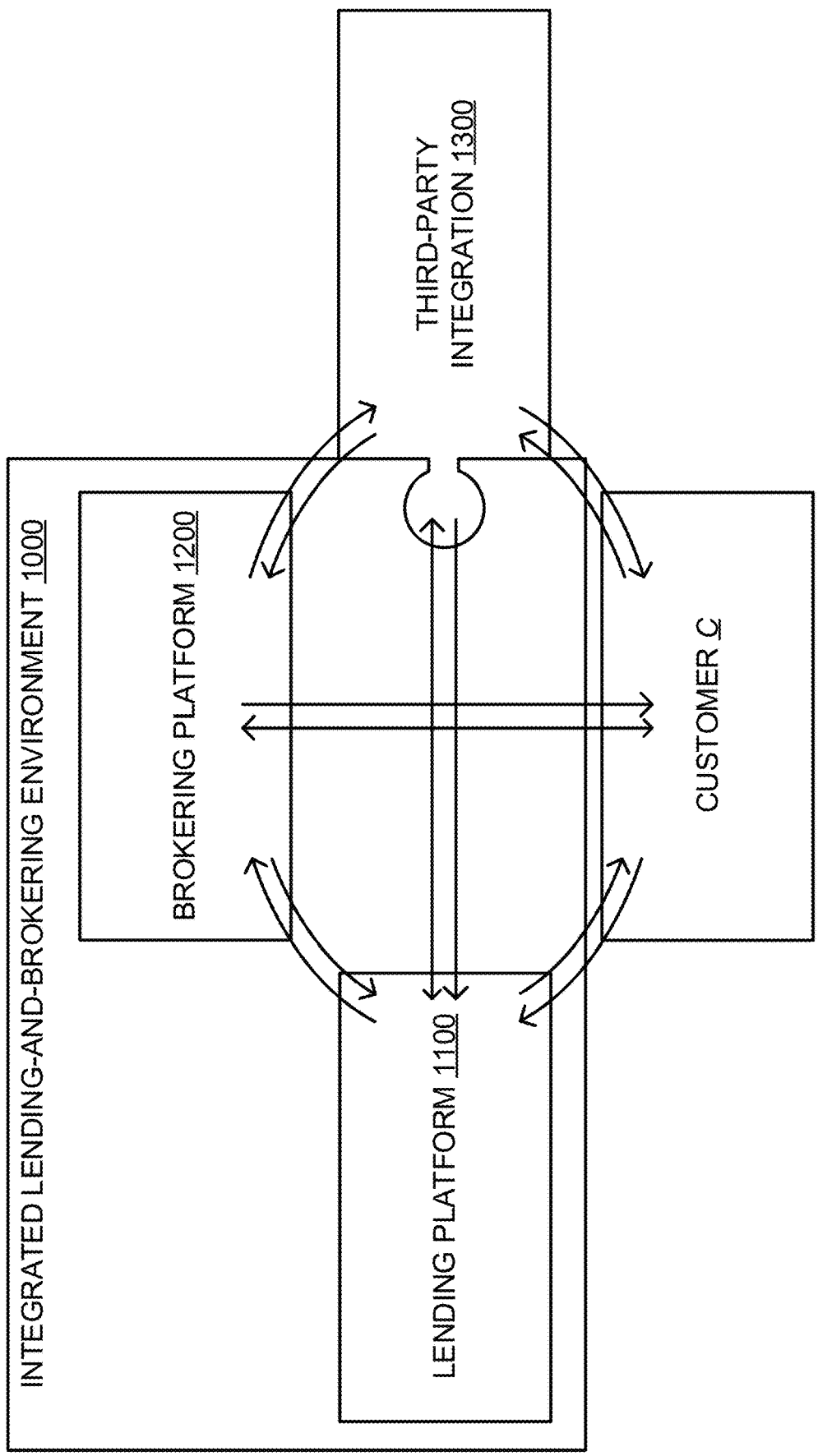
FIG. 1 illustrates an integrated lending-and-brokering environment including a lending platform in accordance with some embodiments.

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

Unless defined otherwise, all technical and scientific terms used herein have the same meaning as commonly understood by those of ordinary skill in the art.

As previously set forth, lending requires many fragmented, often manual processes of both borrowers and lenders. Moreover, such processes are highly specific to loan type. This obviates any financial benefit from economies of scale that could otherwise be passed onto borrowers and lenders alike if such processes were more tightly integrated and generalized across the loan types. Accordingly, there is a need for a more highly automated, more tightly integrated, configurable lending platform that dissolves lines between lending for secured and unsecured loans.

Disclosed herein is an integrity-and-volume testing system for an unsecured loan-lending system and methods thereof in support of at least the foregoing need.

For example, the integrity-and-volume testing system includes, in some embodiments, a data-preparation module, a quality-assurance framework, and a development version of the unsecured loan-lending system. The data-preparation module is configured to prepare sample loan-application input values for borrower-related information and loan-product information. The quality-assurance framework is configured to generate sample loan applications from the sample loan-application input values, as well as validate processed sample loan applications against processed-as-expected loan applications. The development version of the unsecured loan-lending system is configured to process the sample loan applications into the processed sample loan applications for validation against the processed-as-expected loan applications. Also disclosed herein is a method of the integrity-and-volume testing system for the unsecured loan-lending system.

FIG. 1 illustrates an integrated lending-and-brokering environment 1000 including a lending platform 1100 in accordance with some embodiments.

As shown in FIG. 1, the integrated lending-and-brokering environment 1000 includes, in some embodiments, the lending platform 1100, a brokering platform 1200, and third-party integration 1300, wherein the integrated lending-and-brokering environment 1000 is configured for information sharing such that at least a customer need not provide duplicative customer information to any systems of the integrated lending-and-brokering environment 1000 or any personnel associated therewith. The lending platform 1100 is configured for gathering and processing lending-related information for originating loans, servicing loans, or both, wherein the loans are selected from unsecured loans and secured loans. The brokering platform 1200 is configured for gathering and processing brokering-related information for buying assets, selling assets, buying services related to selling the assets, or a combination thereof, wherein the assets include real estate, and wherein the services include services for improving such real estate (e.g., home improvement-related services). The third-party integration 1300 includes one or more interfaces with the lending-and-brokering environment 1000 such as one or more APIs, one or more web applications, or at least one API and at least one web application. The third-party integration 1300 allows the one or more third-parties to at least contribute additional information for the processing of the lending-related information, the brokering-related information, or both.

Figure 2:
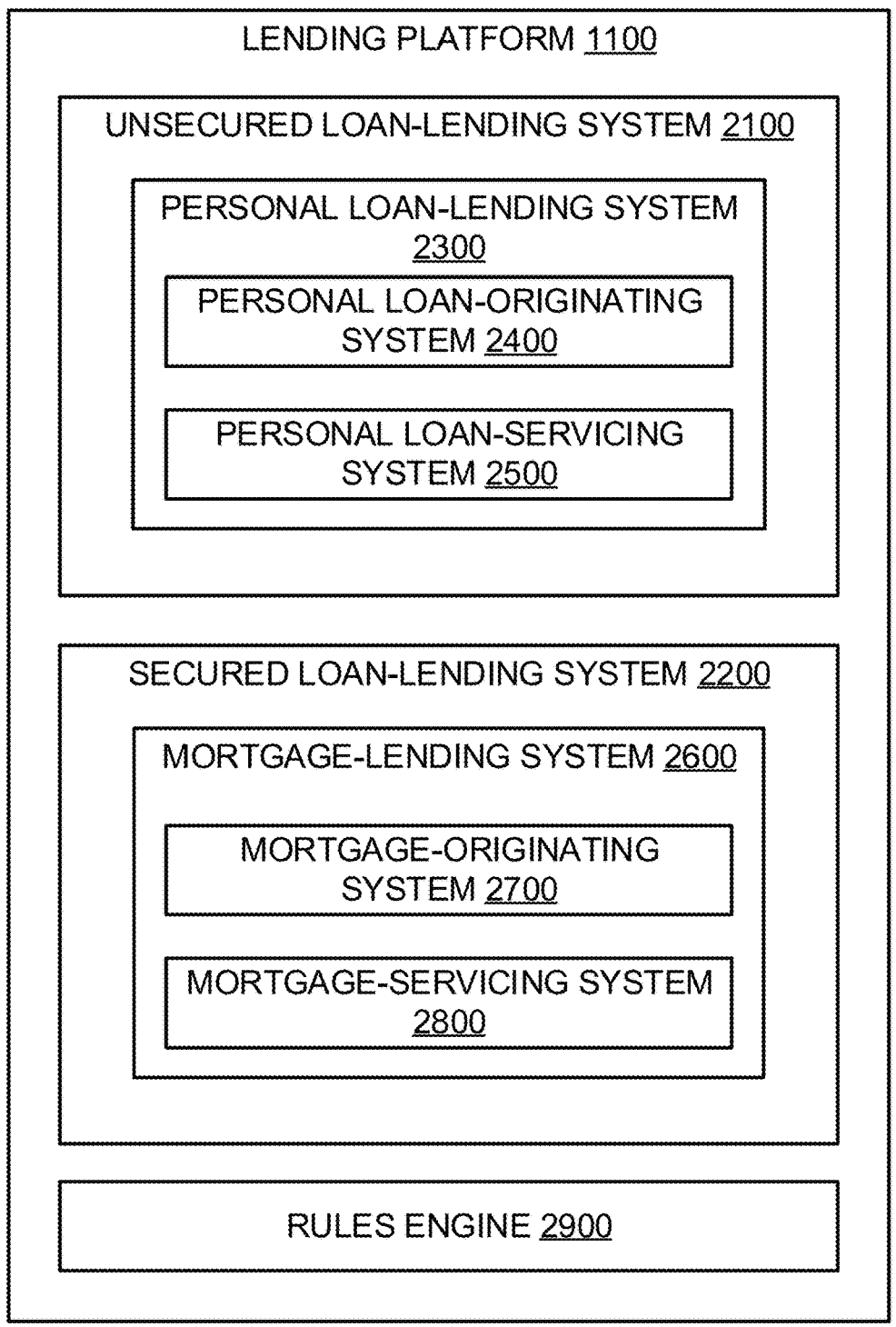
FIG. 2 illustrates the lending platform including an unsecured loan-lending system in accordance with some embodiments.

FIG. 2 illustrates the lending platform 1100 including an unsecured loan-lending system 2100 in accordance with some embodiments.

As shown in FIG. 2, the lending platform 1100 includes the unsecured loan-lending system 2100, a secured loan-lending system 2200, and a rules engine 2900. In consideration of personal loans being one type of unsecured loan of many types of unsecured loans, the unsecured loan-lending system 2100 can include a personal loan-lending system 2300 having a personal loan-originating system 2400 and a personal loan-servicing system 2500 as shown. The personal loan-originating system 2400 is configured for originating personal loans. The personal loan-servicing system 2500 is configured for servicing the personal loans. Again, the foregoing is in consideration of personal loans being one type of unsecured loan of many types of unsecured loans. It should be understood the unsecured loan-lending system 2100 can be further configured, or alternatively configured, to support analogous systems for other types of unsecured loans such as personal lines of credit, student loans, or credit cards. The unsecured-loan lending system 2100 includes one or more server hosts (see FIG. 6) supporting an unsecured loan-originating application stack for originating the unsecured loans and an unsecured loan-servicing application stack for servicing the unsecured loans.

The secured loan-lending system 2200 includes at least a mortgage-lending system 2600 having a mortgage-originating system 2700 and a mortgage-servicing system 2800.

The rules engine 2900 includes a number of decisioning engines for the lending platform 1100 including one or more decisioning engines for the unsecured loan-lending system 2100, one or more decisioning engines for the secured loan-lending system 2200, or both. The rules engine 2900 includes rules for implementing different configurations of the lending platform 1100, or portions thereof (e.g., the borrower interface 3530 or the lender interface 3540 of FIG. 3), for loan products of different types, the loan products in different states, and selection of one or more of the loan products by different consumers. As a separate part of the lending platform 1100, the rules engine 2900 facilitates modularity and extensibility without affecting other modules of lending platform 1100 such as the unsecured loan-lending system 2100 or the secured loan-lending system 2200.

Figure 3:
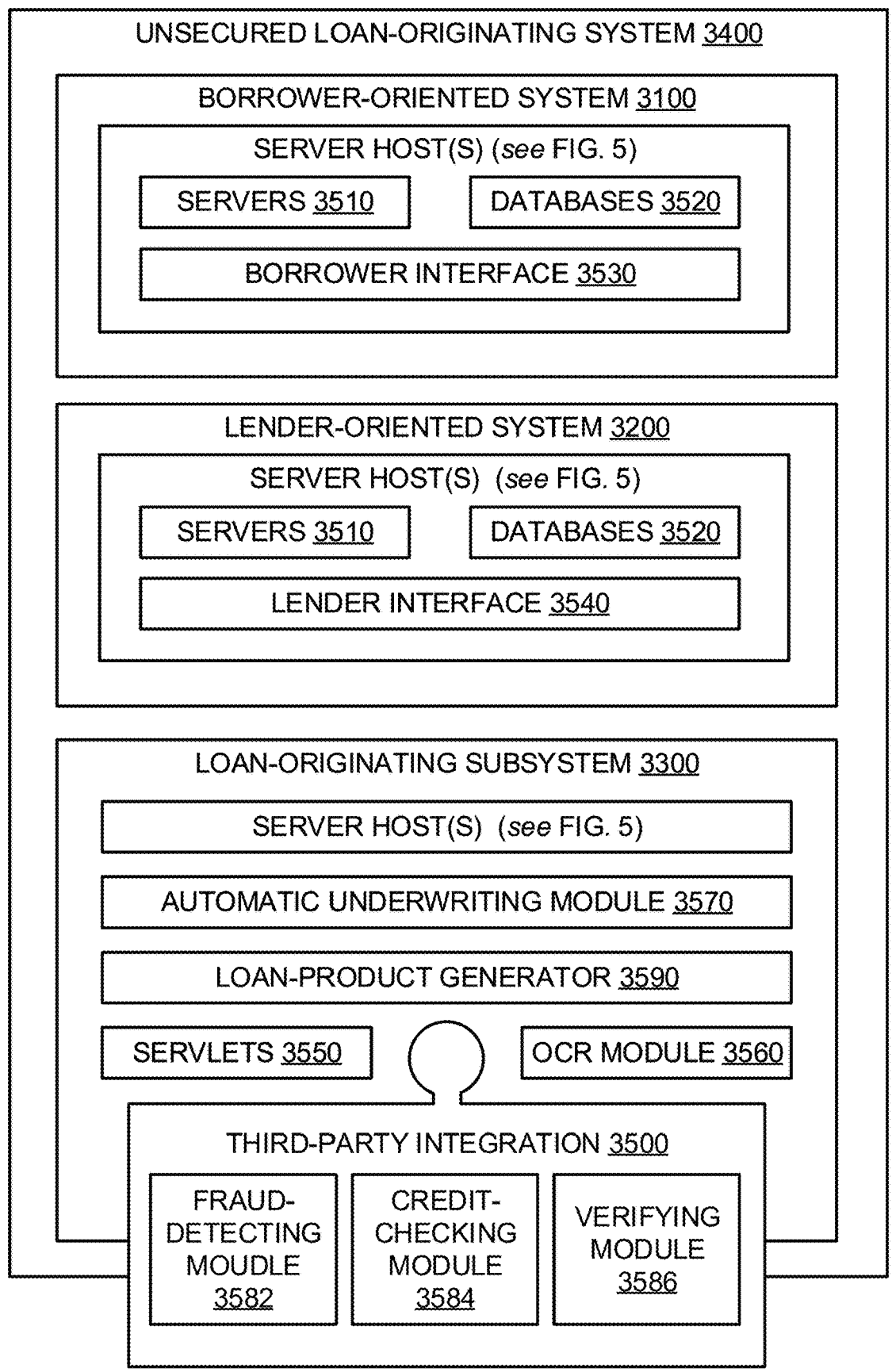
FIG. 3 illustrates an unsecured loan-originating system of the unsecured loan-lending system in accordance with some embodiments.

FIG. 3 illustrates an unsecured loan-originating system 3400 of the unsecured loan-lending system 2100 in accordance with some embodiments.

As shown in FIG. 3, the unsecured loan-originating system 3400 includes a borrower-oriented system 3100, a lender-oriented system 3200, a loan-originating subsystem 3300 for at least loan-application processing, and third-party integration 3500 supporting unsecured-loan origination.

Figure 6:
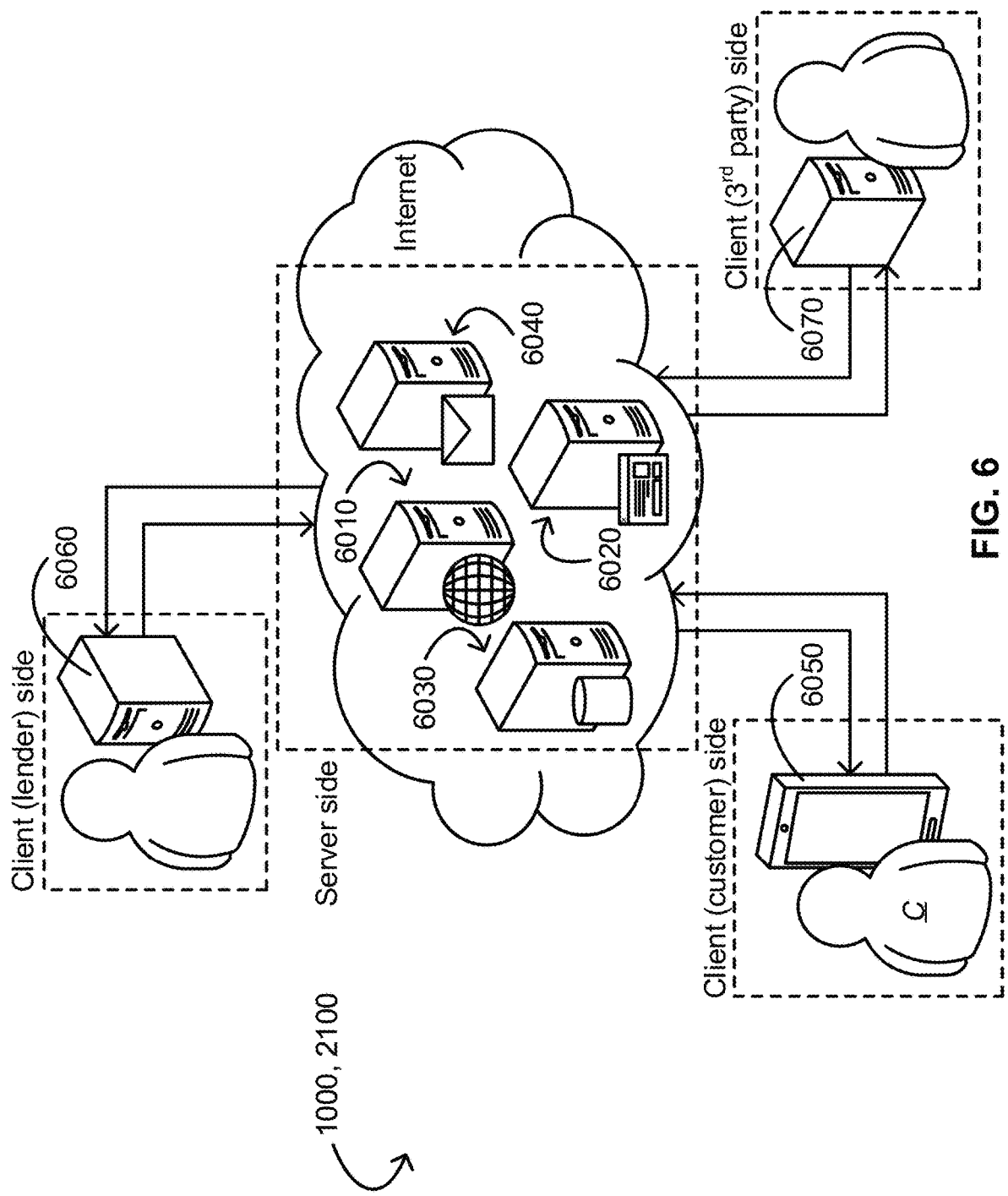
FIG. 6 illustrates the integrated lending-and-brokering environment, or the unsecured loan-lending system thereof, supported by a number of server hosts networked with a number of client hosts in accordance with some embodiments.

Again, the unsecured-loan lending system 2100 includes one or more server hosts (see FIG. 6). The one or more server hosts can be shared among at least the borrower-oriented system 3100, the lender-oriented system 3200, and the loan-originating subsystem 3300 of the unsecured loan-originating system 2400. That said, each system of the borrower-oriented system 3100, the lender-oriented system 3200, and the loan-originating subsystem 3300 can alternatively or additionally include one or more dedicated server hosts as needed.

The unsecured loan-originating application stack for originating the unsecured loans includes a web server, an application server, a database server, one or more databases, and an e-mail server. Collectively, such servers and databases are respectively shown in FIG. 3 as servers 3510 and databases 3520. Each server of the web server, the application server, the database server, and the e-mail server is configured to operate at least in part in a primary memory of at least one server host of the one or more server hosts.

The application server is configured to provide at least a web application configured to operate at least in part in a primary memory of a computer system and present a borrower interface 4000, or borrower GUI 4000, (see FIG. 4) within a web browser on a screen of a display of the computer system. For example, the application server is configured to provide a mobile web application configured to operate at least in part in a primary memory of a mobile device and present the borrower GUI 4000 within a mobile web browser on a touchscreen of a display of the mobile device. The borrower GUI 4000 is configured to allow potential borrowers to enter borrower-related information into a number of borrower-fillable sections of a digital application.

Figure 4:
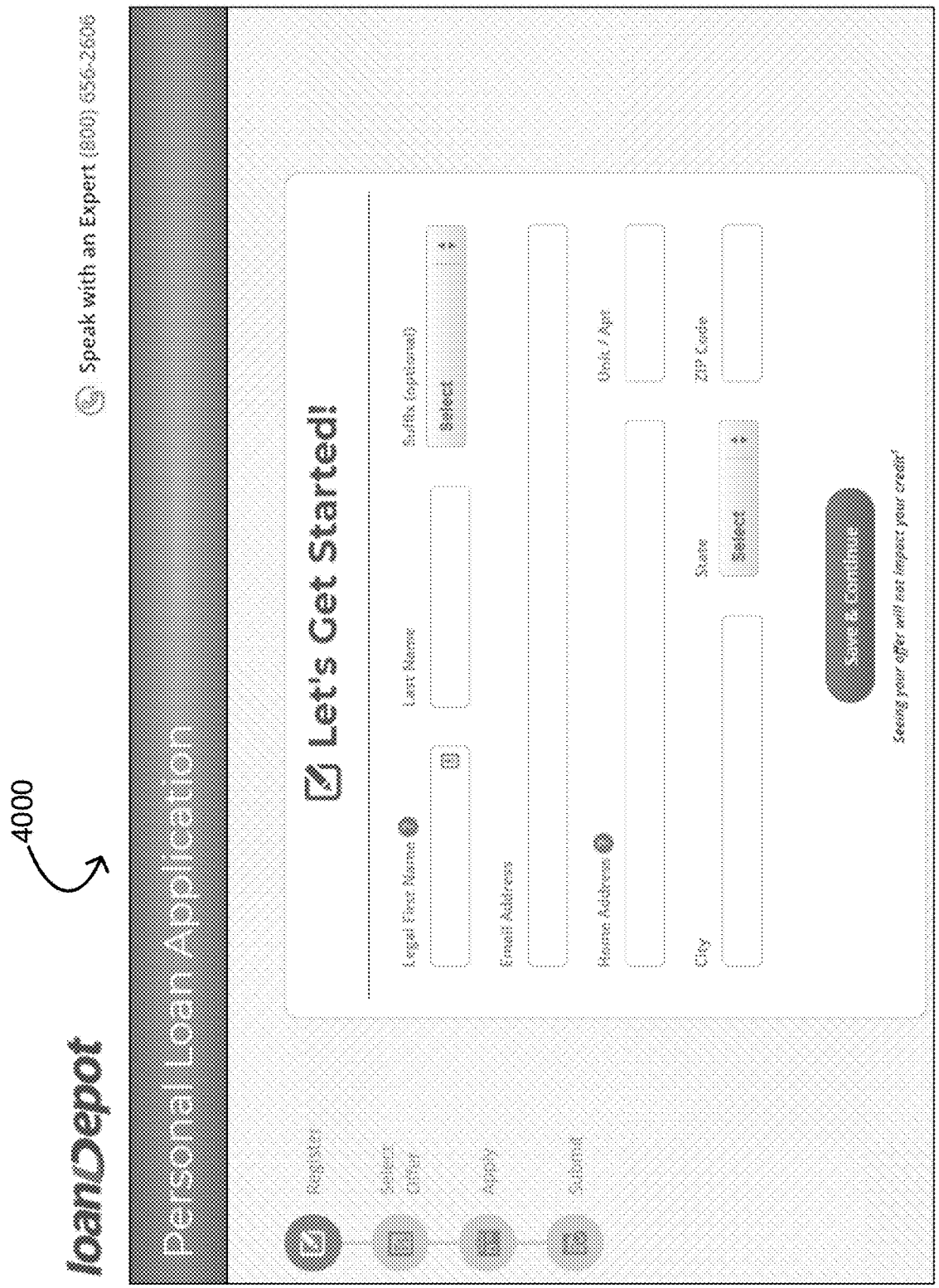
FIG. 4 illustrates a borrower interface of a web application of the unsecured loan-originating system in accordance with some embodiments.

FIG. 4 illustrates the borrower interface 4000 of the web application of the unsecured loan-originating system 3400 in accordance with some embodiments.

The number of borrower-fillable sections of the digital application include a borrower-account registration section as shown in FIG. 4, as well as a loan-purpose section, a borrower-profile section, an income-information section, an employment-history section, a banking-information section, or one or more combinations of the foregoing borrower-fillable sections. Such sections are not presented to a potential borrower all at once in order to avoid inundating the potential borrower, as inundating the potential borrower can reduce quality of the borrower-related information provided by the borrow in the number of borrower-fillable sections. Each section of the number of sections is configured to hold the borrower-related information until transferred to the database server and stored in a database of the one or more databases 3520 on a storage device of the at least one server host of the one or more server hosts. As such, a digital application for a potential borrower can exist in an incomplete state in the database of the one or more databases 3520. Furthermore, the borrower interface 4000 exemplified in FIG. 4 exists in a borrower-recognizable state corresponding to the incomplete state of the digital application in the database of the one or more databases 3520. For example, if the potential borrower has finished with the borrower-account registration but has not selected an offer in accordance with the next section of the digital application as shown in FIG. 4, this is recorded in the database of the one or more databases 3520 and recognized by the potential borrower in the borrower interface as a required step for moving to the next section of the digital application. The borrower-related information from the banking information section transferred to the database server and stored in the one or more databases 3520 on a storage device of the at least one server host of the one or more server hosts is later used by the unsecured loan-originating system 3400 for automatically depositing unsecured-loan funds depending upon the type of unsecured loan.

Each section of the number of sections of the digital application optionally includes one or more graphical elements such as an on-screen button (see, for example, button labeled "Save & Continue" in FIG. 4) configured to respectively activate one or more servlets 3550 (see FIG. 3) of the loan-originating subsystem 3300 upon activation by a potential borrower. One or more of the servlets is configured to allow the potential borrowers to upload electronic copies or images of documents selected from at least driver's licenses, pay stubs, and bank statements.

In association with the foregoing servlets, the unsecured loan-originating system 3400 also includes an OCR module 3560 as shown in FIG. 3. The OCR module 3560 is configured to recognize text in uploaded images of documents, extract text from the images, and provide the text by way of the web server for automated filling of the borrower-related information.

Adverting to FIG. 3, the application server is also configured to provide at least a web application configured to operate at least in part in a primary memory of another computer system and present a lender interface 3540, or lender GUI 3540, within a web browser on a screen of a display of the computer system. For example, the application server is configured to provide at least a web application configured to operate at least in part in a primary memory of a personal computer and present a lender GUI within a web browser on a screen of a monitor associated with the personal computer. The lender GUI 3540 is configured to allow a representative of the lender to review the borrower-related information entered in the number of sections of the digital application.

The lender GUI 3540 is configured to allow the representative of the lender to send secured e-mail messages through the lender GUI 3540 by way of the e-mail server with automatic e-mail headers and attachments determined in accordance with a focus in the lender GUI 3540 on a particular borrower and loan process step. The secured e-mail messages can solicit additional borrower-related information and direct recipient borrower to one or more pages of a web site or the borrower GUI 4000 to upload electronic copies or images of documents.

The unsecured loan-originating system 3400 includes an automatic underwriting module 3570 configured to perform detailed risk assessments in view of the borrower-related information transferred to the database server and stored in the one or more databases 3520 on the storage device of the at least one server host of the one or more server hosts. The third-party integration 3500 includes one or more API modules such as a fraud-checking module 3582, credit-checking module 3584, and a verifying module 3586 configured for transferring loan-related information between the unsecured loan-originating system 3400 and third parties such as fraud-detecting companies bureaus, credit bureaus, employment-verification providers, or other third-party vendors.

The unsecured loan-originating system 3400 can include a loan-product generator 3590 configured to generate different loan products from which potential borrowers can choose once at least some of the borrower-related information from the digital application is processed.

Figure 5:
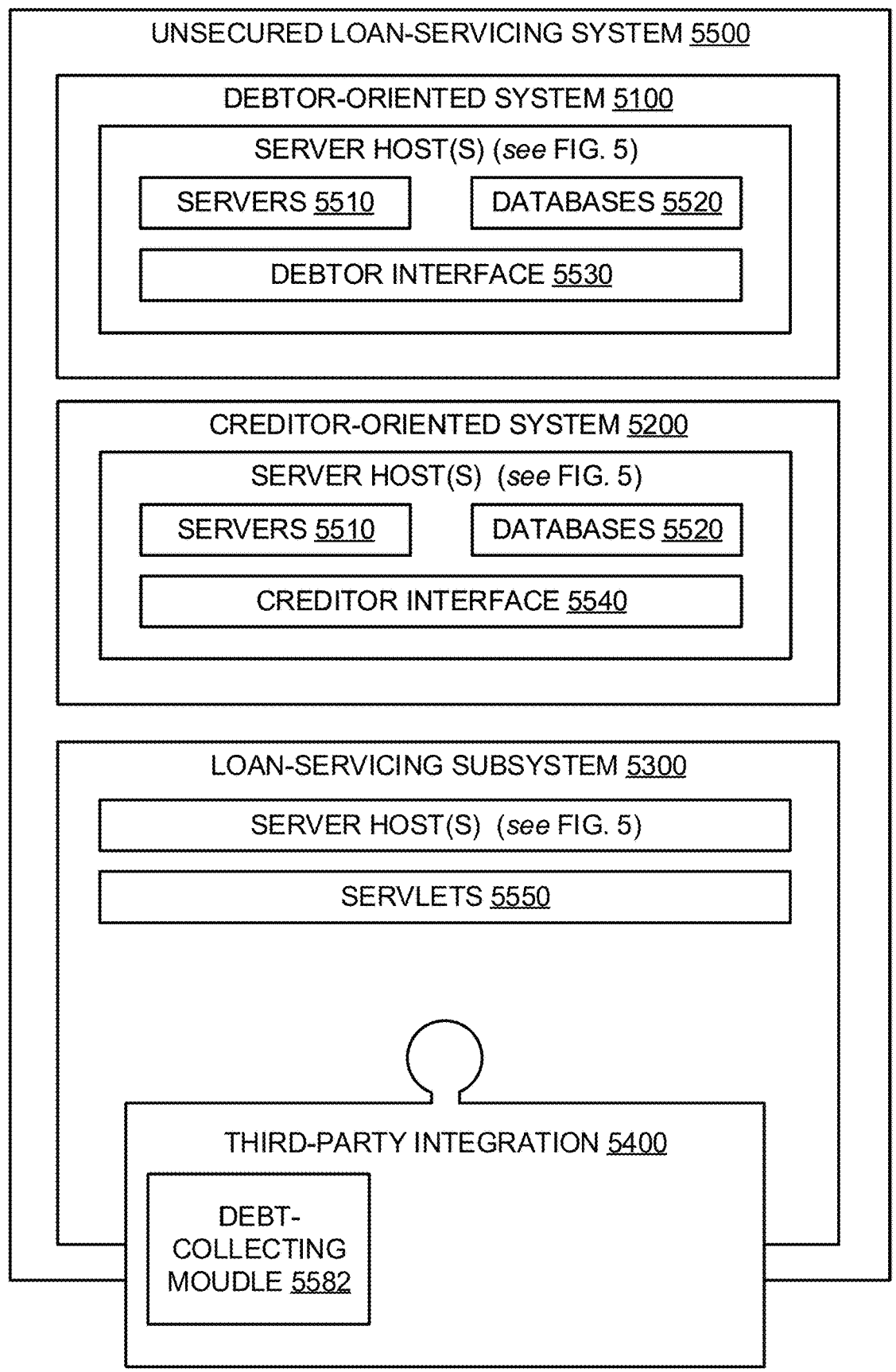
FIG. 5 illustrates an unsecured loan-servicing system of the unsecured loan-lending system in accordance with some embodiments.

FIG. 5 illustrates an unsecured loan-servicing system 5500 of the unsecured loan-lending system 2100 in accordance with some embodiments.

As shown in FIG. 5, the unsecured loan-servicing system 5500 includes a debtor-oriented system 5100, a creditor-oriented system 5200, a loan-servicing subsystem 5300, and third-party integration 5400 supporting unsecured-loan servicing. Again, the unsecured-loan lending system 2100 includes one or more server hosts (see FIG. 6). The one or more server hosts can be shared among at least the debtor-oriented system 5100, the creditor-oriented system 5200, and the loan-servicing subsystem 5300 of the unsecured loan-servicing system 5500. That said, each system of the debtor-oriented system 5100, the creditor-oriented system 5200, and the application-processing system 5300 can alternatively or additionally include one or more dedicated server hosts as needed.

The unsecured loan-servicing application stack for servicing the unsecured loans includes a web server, an application server, a database server, one or more databases, and an e-mail server. Collectively, such servers and databases are respectively shown in FIG. 5 as servers 5510 and databases 5520. Each server of the web server, the application server, the database server, and the e-mail server is configured to operate at least in part in a primary memory of at least one server host of the one or more server hosts.

The application server is configured to provide at least a web application configured to operate at least in part in a primary memory of a computer system and present a debtor interface 5530, or debtor GUI 5530, within a web browser on a screen of a display of the computer system. For example, the application server is configured to provide a mobile web application configured to operate at least in part in a primary memory of a mobile device and present a debtor GUI within a mobile web browser on a touchscreen of a display of the mobile device. The debtor GUI 5530 is configured to allow borrowers to pay down existing unsecured loans.

The debtor GUI 5530 optionally includes one or more graphical elements such as an on-screen button (see, for example, button labeled "Save & Continue" in FIG. 4) configured to respectively activate one or more servlets 5550 (see FIG. 3) of the loan-servicing subsystem 5300 upon activation by a debtor. One or more of the servlets is configured to allow the debtor to transfer funds by way of an Automated Clearing House ("ACH") transfer from a linked bank account to pay down an existing unsecured loan.

The borrower-related information from the banking information section of the digital application transferred to the database server and stored in the one or more databases 3520 on the storage device of the at least one server host of the one or more server hosts can be used by the unsecured loan-servicing system 5500 for automatically setting up monthly ACH payments on unsecured loans in accordance with terms of the unsecured loans, which terms can range from 3 to 5 years.

The application server is also configured to provide at least a web application configured to operate at least in part in a primary memory of another computer system and present a creditor interface 5540, or creditor GUI 5540, within a web browser on a screen of a display of the computer system. For example, the application server is configured to provide at least a web application configured to operate at least in part in a primary memory of a personal computer and present a creditor GUI within a web browser on a screen of a monitor associated with the personal computer. The creditor GUI 5540 is configured to allow a representative of the creditor to review the borrower-related information for debtors with existing unsecured loans.

The third-party integration 5400 includes one or more API modules such as a debt-collecting module 5582 configured for transferring loan-related information between the unsecured loan-servicing system 5500 and third parties such as debt collectors.

FIG. 6 illustrates the integrated lending-and-brokering environment 100, or the unsecured loan-lending system 2100 thereof, supported by a number of server hosts networked with a number of client hosts in accordance with some embodiments.

The integrated lending-and-brokering environment 1000, or the unsecured loan-lending system 2100 thereof, includes one or more application stacks such as the unsecured loan-originating application stack and the unsecured loan-servicing application stack. Each application stack is independently configured to run at least in part from a primary memory of at least one server host of the server hosts 6010, 6020, 6030, and 6040.

As shown in FIG. 6, the server hosts 6010, 6020, 6030, and 6040 can include a web server, an application server, a database server with an associated database, an e-mail server configured to send and receive secured e-mail messages, or a combination thereof. For expository convenience, the server host 6010 is shown to support the web server, the server host 6020 is shown to support the application server, the server host 6030 is shown to support the database server, and the server host 6040 is shown to support the e-mail server; however, the web server, the application server, the database server, and the e-mail server can be supported by any one or more of the server hosts 6010, 6020, 6030, and 6040 in any of a number of ways. Optionally, the server hosts 6010, 6020, 6030, and 6040 further support mobile device-oriented server counterparts such as a mobile web server or a mobile application server if such mobile device-oriented server counterparts are not already integrated with their counterpart servers.

With respect to the unsecured loan-originating application stack for originating unsecured loans, an application server of the unsecured loan-originating application stack supported by, for example, the server host 6020 can include a borrower-oriented web application server module (not shown) configured to service requests from one of more client hosts such as a borrower's client host 6050 for a borrower-oriented web application (e.g., the borrower GUI 4000). The borrower-oriented web application server module can be a mobile web application server module configured to service requests from one of more mobile devices (e.g., smart phones, tablet computers, etc.) for a mobile web application version of the borrower-oriented web application. The unsecured loan-originating application stack can also include a lender-oriented web application server module (not shown) configured to service requests from one of more client hosts such as a lender's client host 6060 for a lender-oriented web application (e.g., the lender GUI 3540). The lender-oriented web application server module can be a mobile web application server module configured to service requests from one of more mobile devices (e.g., smart phones, tablet computers, etc.) for a mobile web application version of the lender-oriented web application.

With respect to the unsecured loan-servicing application stack for servicing unsecured loans, an application server of the unsecured loan-servicing application stack supported by, for example, the server host 6020 can include a debtor-oriented web application server module (not shown) configured to service requests from one of more client hosts such as a borrower's client host 6050 for a debtor-oriented web application (e.g., the debtor GUI 5530). The debtor-oriented web application server module can be a mobile web application server module configured to service requests from one of more mobile devices (e.g., smart phones, tablet computers, etc.) for a mobile web application version of the debtor-oriented web application. The unsecured loan-servicing application stack can also include a creditor-oriented web application server module (not shown) configured to service requests from one of more client hosts such as a creditor's client host for a creditor-oriented web application (e.g., the creditor GUI 5540). The creditor-oriented web application server module can be a mobile web application server module configured to service requests from one of more mobile devices (e.g., smart phones, tablet computers, etc.) for a mobile web application version of the creditor-oriented web application.

With respect to any third party-oriented application stack, an application server of the third party-oriented application stack supported by, for example, the server host 6020 can include a third party-oriented web application server module (not shown) configured to service requests from one of more client hosts such as a third party's client host 6070 for a third party-oriented web application. The third party-oriented web application server module can be a mobile web application server module configured to service requests from one of more mobile devices (e.g., smart phones, tablet computers, etc.) for a mobile web application version of the third party-oriented web application.

While the foregoing sets forth a number of web applications for client hosts, it should be understood that such client hosts can alternatively run local applications native to the operating systems of the client hosts.

Figure 7:
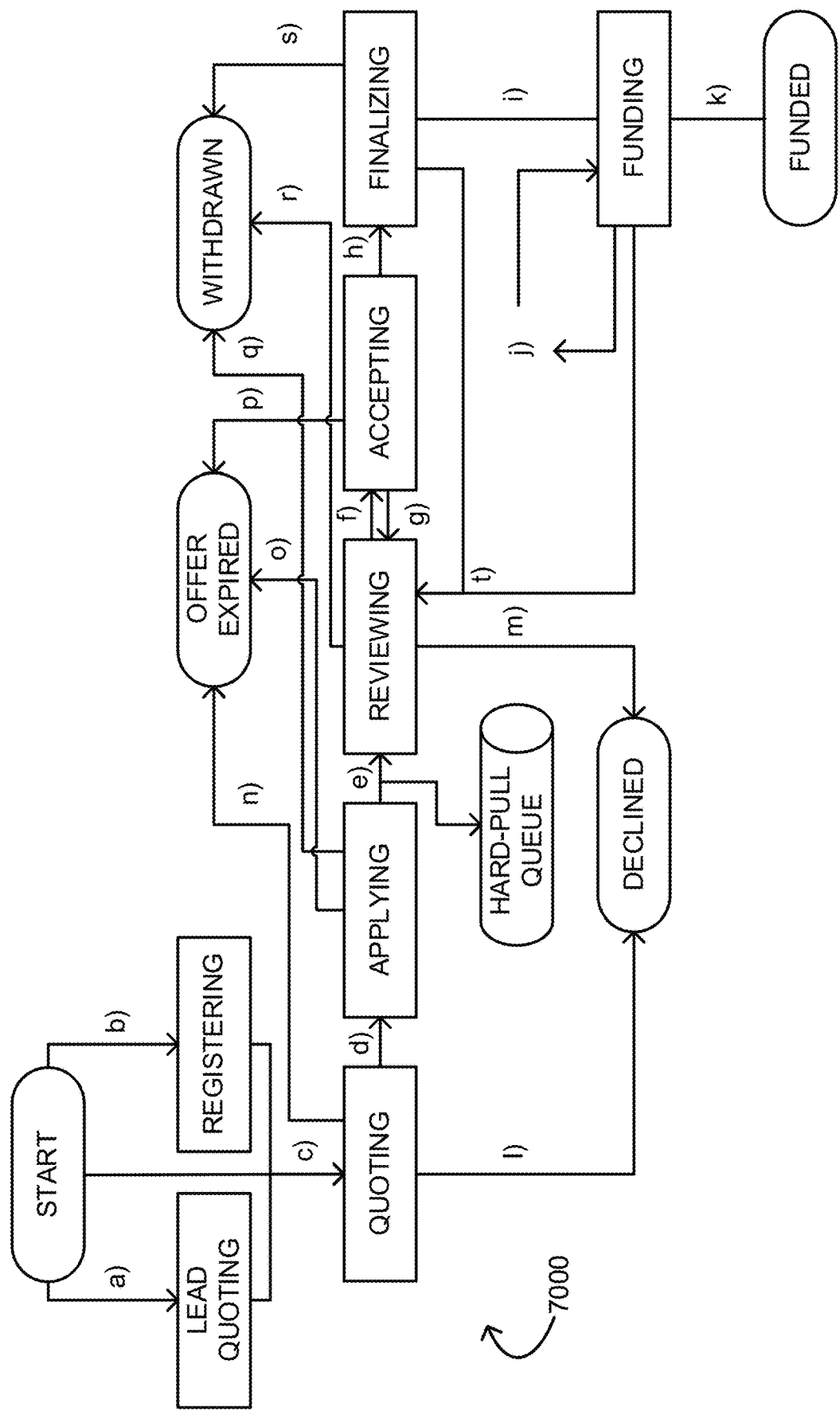
FIG. 7 illustrates a process of the unsecured loan-originating system in accordance with some embodiments.

FIG. 7 illustrates a process 7000 by which potential borrowers and representatives of the lender interact by way of the unsecured loan-originating system 3400 in accordance with some embodiments. The process 7000 from steps a) through k) shows how an unsecured loan is successfully funded. As shown, the process 7000 starts with a) generating an external lead, b) creating a borrower account on the unsecured loan-originating system 3400 by a potential borrower, or c) starting a loan application for the potential borrower by a representative of the lender. The process 7000 continues with the potential borrower d) selecting a quoted offer and e) completing the loan application. The process 7000 continues with an iterative process of an underwriter f) approving one or more portions of the loan application and g) sending the loan application back to one or more other representatives of the lender for further review or follow-up with the potential borrower. Once the loan application is finally approved by the underwriter, the process 7000 continues with the potential borrower h) accepting final loan documents associated with the loan application. However, even after the potential borrower h) accepts the final loan documents associated with the loan application, the process 7000 can require further review in accordance with step t). Upon i) one or more representatives of the lender completing a final verification of the loan application and any supporting documentation, the process 7000 continues with k) sending loan documents to a cooperating bank, an ACH payment to a borrower (formerly the potential borrower) up to a total amount of the loan, and e-mailing the bank with respect to the foregoing. That said, the process 700 could first involve the bank j) rejecting one or more processing batches including the loan before finally funding the loan in accordance with the foregoing. Even then, the process 7000 can require further review in accordance with step t).

The process 7000 from steps a) through k) also show how an unsecured loan can be denied to a potential borrower. For example: A rules engine for credit, fraud, pricing or a combination thereof can 1) decline a loan for the potential borrower instead of the unsecured loan-originating system 3400 quoting one or more offers. The iterative process of the underwriter f) approving one or more portions of the loan application and g) sending the loan application back to the one or more other representatives of the lender for further review or follow-up can also result in the underwriter or a fraud analyst m) declining a loan for the potential borrower. The potential borrower can cause one or more quoted offers to expire by not n) selecting a quoted offer, o) completing the loan application or any requests (e.g., supporting documentation) for verification, or p) accepting the final loan documents. The potential borrower can also actively withdraw from the process 7000 in any step of steps q), r), and s).

Figure 8:
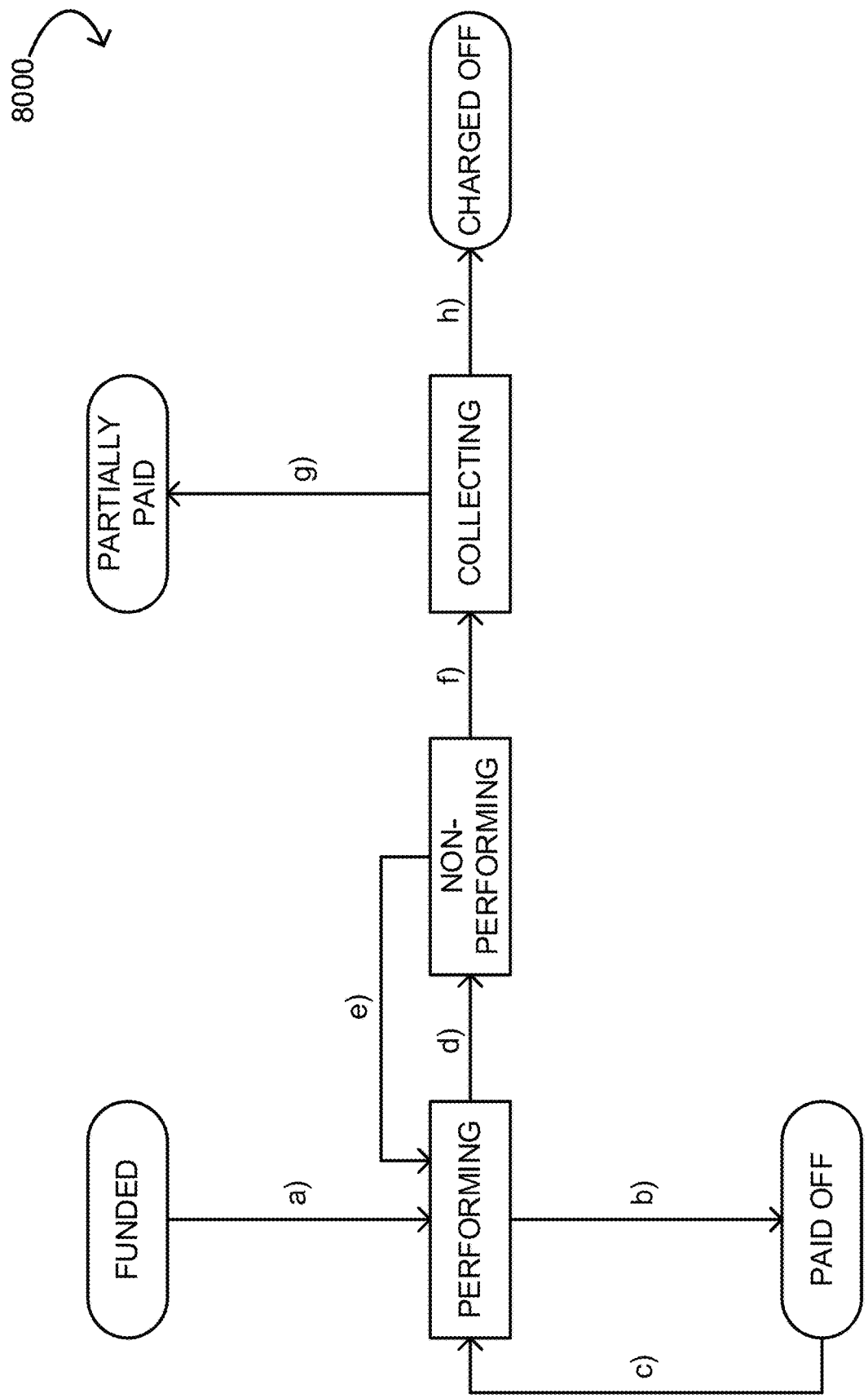
FIG. 8 illustrates a process of the unsecured loan-servicing system in accordance with some embodiments.

FIG. 8 illustrates a process 8000 by which debtors and representatives of the creditor interact by way of the unsecured loan-servicing system 5500 in accordance with some embodiments. The process 8000 from steps a) through h) illustrate how an unsecured loan is successfully paid off. As shown, the process 8000 starts with a) converting the loan application into a loan, which is followed by the borrower b) timely paying off the loan. If the process 8000 continues with the borrower c) reversing his or her payment or the unsecured loan-servicing system 5500 determining the borrower provided an insufficient payment to pay off the loan, the process 8000 can continue with an iterative process of steps c) and d) until the loan is timely paid off.

The process 8000 from steps a) through h) also show how an unsecured loan is either partially paid off or charged off. For example: The process 8000 can start or continue from steps b) and c) with an iterative process of the unsecured loan-servicing system 5500 d) determining one or more payments is late. The borrower can then e) pay off the loan or a portion thereof in accordance with the process 8000. However, if the unsecured loan-servicing system 5500 f) determines the borrower is grossly delinquent with respect to any payment, a collection agency can be used in accordance with the process 8000. Subsequent to collections, the unsecured loan-servicing system 5500 can g) determine payment for the loan was partially recovered and the loan partially paid off or h) the borrower failed to pay off the loan in any capacity, thereby leading to charging off the loan.

Figure 9:
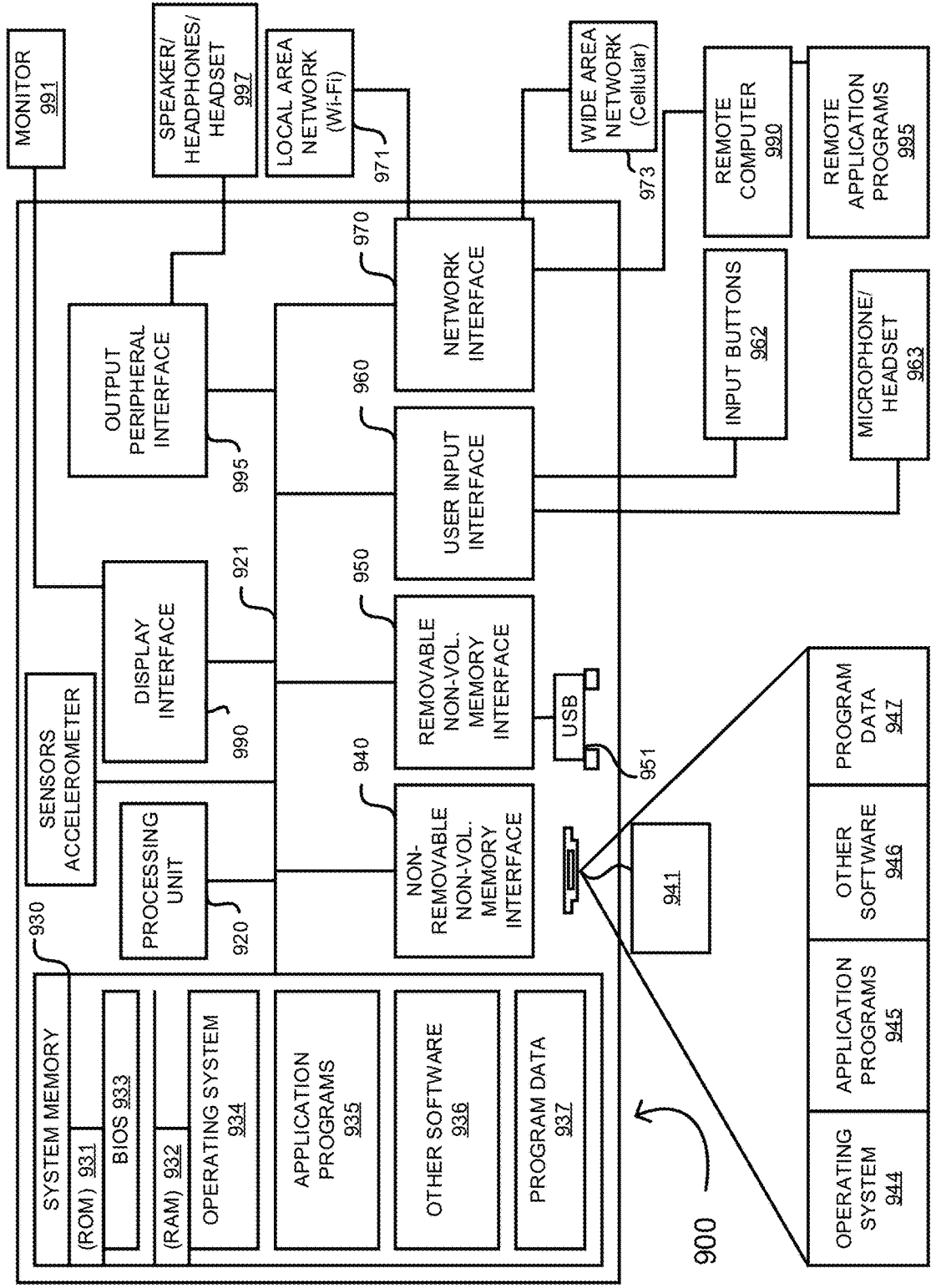
FIG. 9 illustrates components of a network host in accordance with some embodiments.

FIG. 9 illustrates components of a network host 900 such as any one or more server hosts of the integrated lending-and-brokering 1000 in accordance with some embodiments. Components of the network host 900 vary in accordance with host type. As such, each and every component shown and described in reference to FIG. 9 need not be included in each host type. Furthermore, each host type can further include components not shown or described in reference to FIG. 9 but otherwise described herein.

As shown, components of the network host 900 can include, but are not limited to, a processing unit 920 having one or more processing cores, a primary or system memory 930, and a system bus 921 that couples various system components including the system memory 930 to the processing unit 920. The system bus 921 can be any of several types of bus structures selected from a memory bus or memory controller, a peripheral bus, and a local bus using any of a variety of bus architectures.

The network host 900 can include a variety of computer-readable media. Computer-readable media can be any media that can be accessed by the network host 900 and includes both volatile and nonvolatile media, as well as removable and non-removable media. By way of example, and not limitation, use of computer-readable media includes storage of information, such as computer-readable instructions, data structures, other executable software, or other data. Computer-readable media includes, but is not limited to, RAM, ROM, EEPROM, flash memory or other memory technology, CD-ROM, digital versatile disks ("DVD") or other optical disk storage, magnetic cassettes, magnetic tape, magnetic disk storage or other magnetic storage devices, or any other tangible medium that can be used to store the desired information for access by the network host 900. Transitory media such as wireless channels are not included in the computer-readable media. Communication media typically embody computer-readable instructions, data structures, other executable software, or other transport mechanisms and includes any information delivery media. As an example, some client hosts on a network might not have optical or magnetic storage.

The system memory 930 includes computer-readable media in the form of volatile or nonvolatile memory such as read only memory ("ROM") 931 and random-access memory ("RAM") 932. A basic input-output system 933 ("BIOS") containing the basic routines that help to transfer information between elements within the network host 900, such as during start-up, is typically stored in ROM 931. RAM 932 typically contains software or data that are immediately accessible for operations by the processing unit 920. By way of example, and not limitation, FIG. 9 illustrates that RAM 932 can include a portion of the operating system 934, application programs 935, other executable software 936, and program data 937.

The network host 900 can also include other computer-readable media. By way of example only, FIG. 9 illustrates a solid-state memory 941. Other computer-readable media that can be used in the example operating environment include, but are not limited to, universal serial bus ("USB") drives and devices, flash memory cards, solid state RAM, solid state ROM, or the like. The solid-state memory 941 is typically connected to the system bus 921 through a non-removable memory interface such as interface 940, and USB drive 951 is typically connected to the system bus 921 by a removable memory interface such as interface 950.

The drives and their associated computer-readable media provide storage of computer-readable instructions, data structures, other executable software, or other data for the network host 900. In FIG. 9, for example, the solid-state memory 941 is illustrated for storing operating system 944, application programs 945, other executable software 946, or program data 947. Note that these components can either be the same as or different from operating system 934, application programs 935, other executable software 936, and program data 937. Operating system 944, application programs 945, other executable software 946, and program data 947 are given different numbers here to illustrate that, at a minimum, they are different copies.

A user can enter commands and information into the network host 900 through input devices such as a keyboard, touchscreen, or software or hardware input buttons 962, a microphone 963, a pointing device such as a mouse, or scrolling input component such as a trackball or touch pad. The microphone 963 can cooperate with speech recognition software. These and other input devices are often connected to the processing unit 920 through a user input interface 960 that is coupled to the system bus 921 but can be connected by other interface and bus structures, such as a parallel port, game port, or USB. A display monitor 991 or other type of display screen device is also connected to the system bus 921 via an interface such as a display interface 990. In addition to the monitor 991, the network host 900 can also include other peripheral output devices such as speakers 997 and other output devices, which can be connected through an output peripheral interface 995.

The network host 900 can operate in a networked environment using logical connections to one or more other network hosts such as network host 980. Like the network host 900, the network host 980 can be a personal computer, a server, a router, a network PC, a peer device, or another network node. The logical connections depicted in FIG. 9 can include a local area network ("LAN") 971 (e.g., Wi-Fi) or a wide area network ("WAN") 973 (e.g., cellular network). Such networking environments are commonplace in offices, enterprise-wide computer networks, intranets and the Internet. A browser application can be resident on the network host 900 and stored in the memory.

When used in a LAN networking environment, the network host 900 is connected to the LAN 971 through a network interface or adapter 970, which can be, for example, a Bluetooth® or Wi-Fi adapter. When used in a WAN networking environment (e.g., Internet), the network host 900 can include some means for establishing communications over the WAN 973. With respect to telecommunication technologies, for example, a radio interface, which can be internal or external, can be connected to the system bus 921 via the network interface 970, or another appropriate mechanism. In a networked environment, other software depicted relative to the network host 900, or portions thereof, can be stored in the remote memory storage device. By way of example, and not limitation, FIG. 9 illustrates remote application programs 985 as residing on the network host 980. It will be appreciated that the network connections shown are examples and other means of establishing a communications link between the network hosts can be used.

As discussed, the network host 900 can include a processor 920, a memory (e.g., ROM 931, RAM 932, etc.), an AC power input, a display screen, and built-in Wi-Fi circuitry to wirelessly communicate with other network hosts connected to the network.

Another device that can be coupled to bus 921 is a power supply such as a DC power supply (e.g., battery) or an AC adapter circuit. As discussed above, the DC power supply can be a battery, a fuel cell, or similar DC power source that needs to be recharged on a periodic basis. A wireless communication module can employ a Wireless Application Protocol to establish a wireless communication channel. The wireless communication module can implement a wireless networking standard.

In some embodiments, software used to facilitate algorithms discussed herein can be embodied into a non-transitory computer-readable medium. A computer-readable medium includes any mechanism that stores information in a form readable by a computer. For example, a non-transitory machine-readable medium can include ROM; RAM; magnetic disk storage media; optical storage media; flash memory devices; DVDs, EPROMs, EEPROMs, FLASH memory, magnetic or optical cards, or any type of media suitable for storing electronic instructions.

An application described herein includes, but is not limited to, software applications and programs that are part of an operating system or integrated with or on an application layer thereof. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a network host, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry.

Figure 10A:
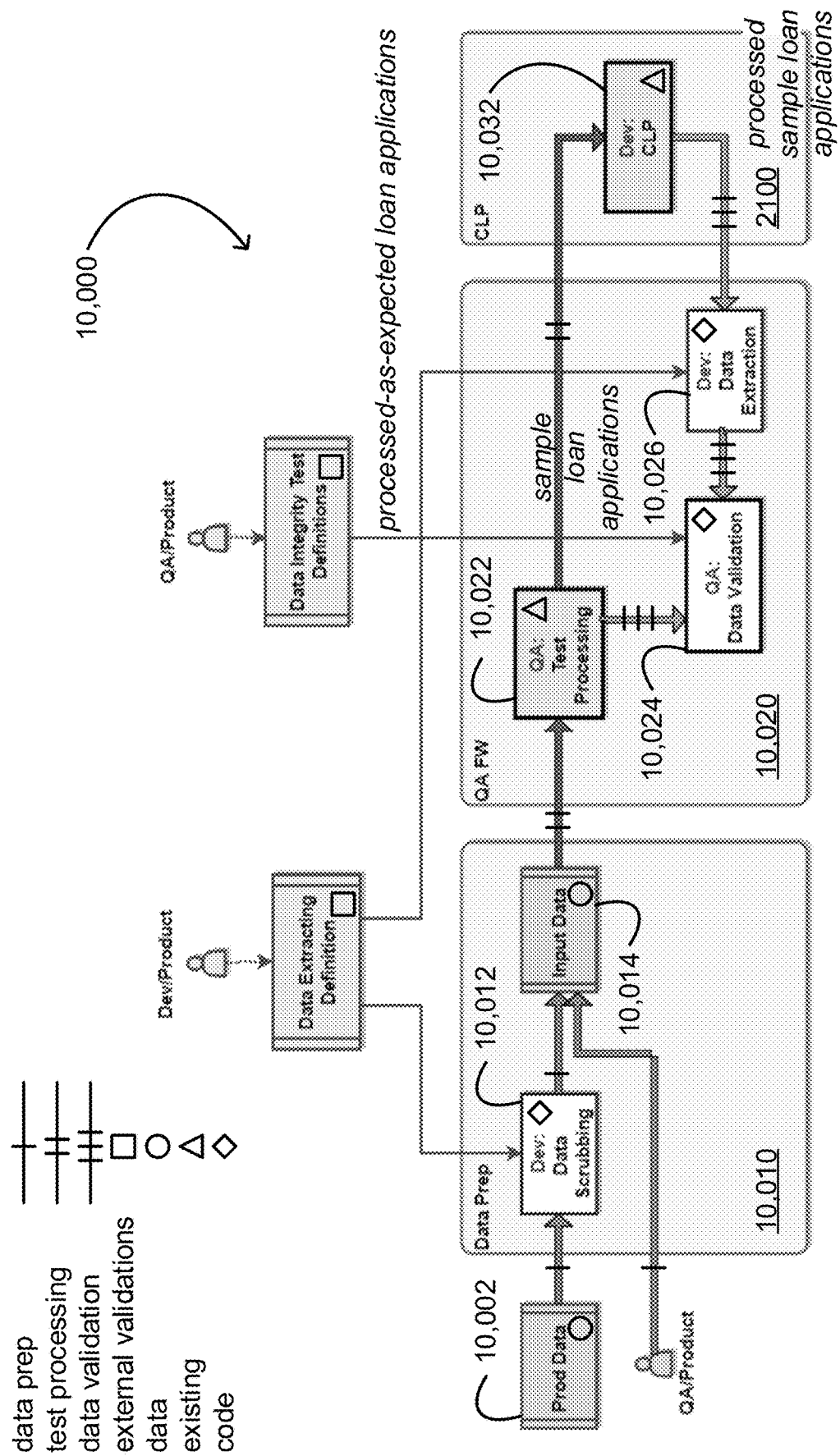
FIG. 10A illustrates an integrity-and-volume testing system coupled to an unsecured loan-lending system in accordance with some embodiments.
Figure 10B:
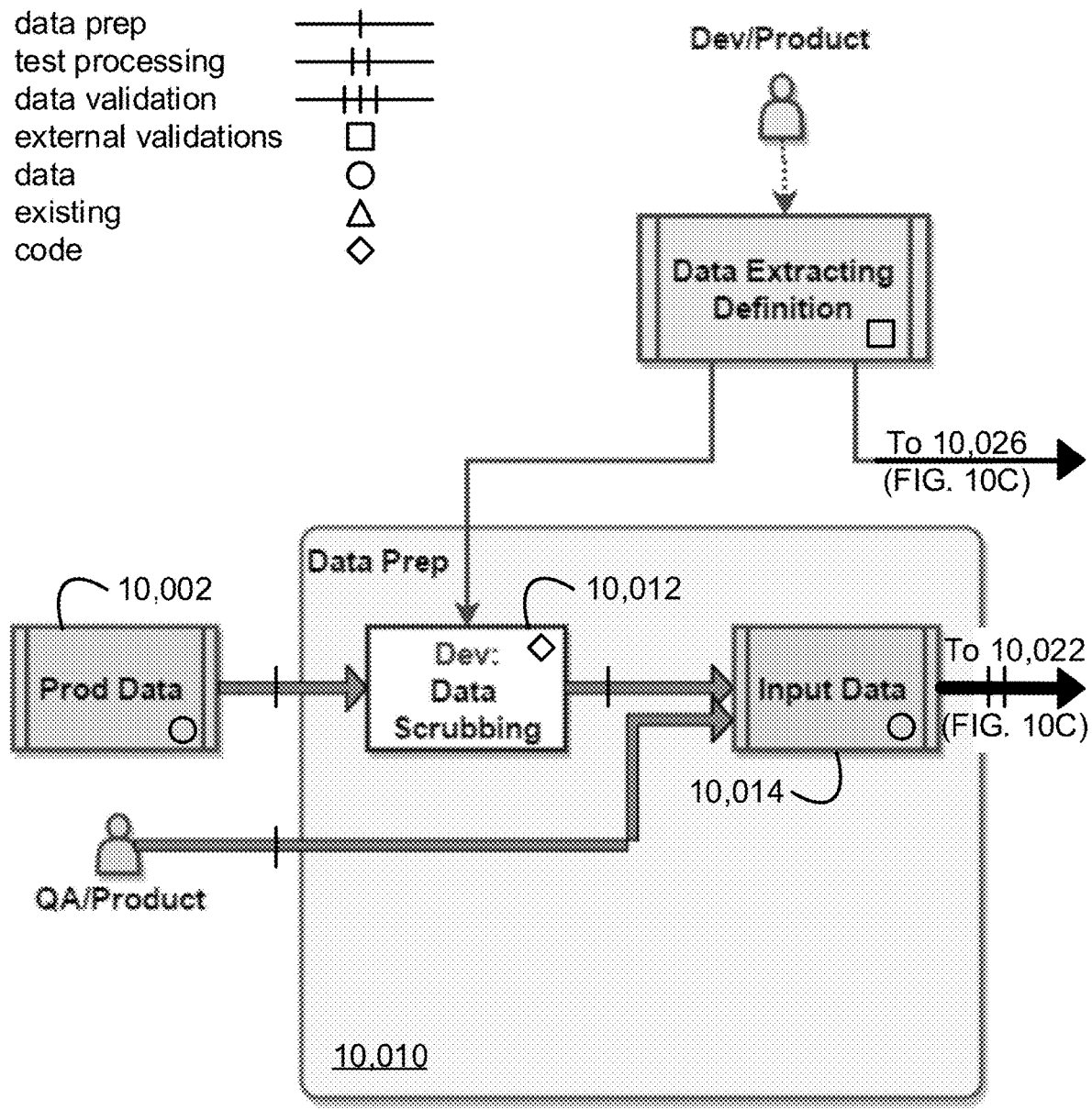
FIG. 10B illustrates a data preparation module of the integrity-and-volume testing system in accordance with some embodiments.
Figure 10C:
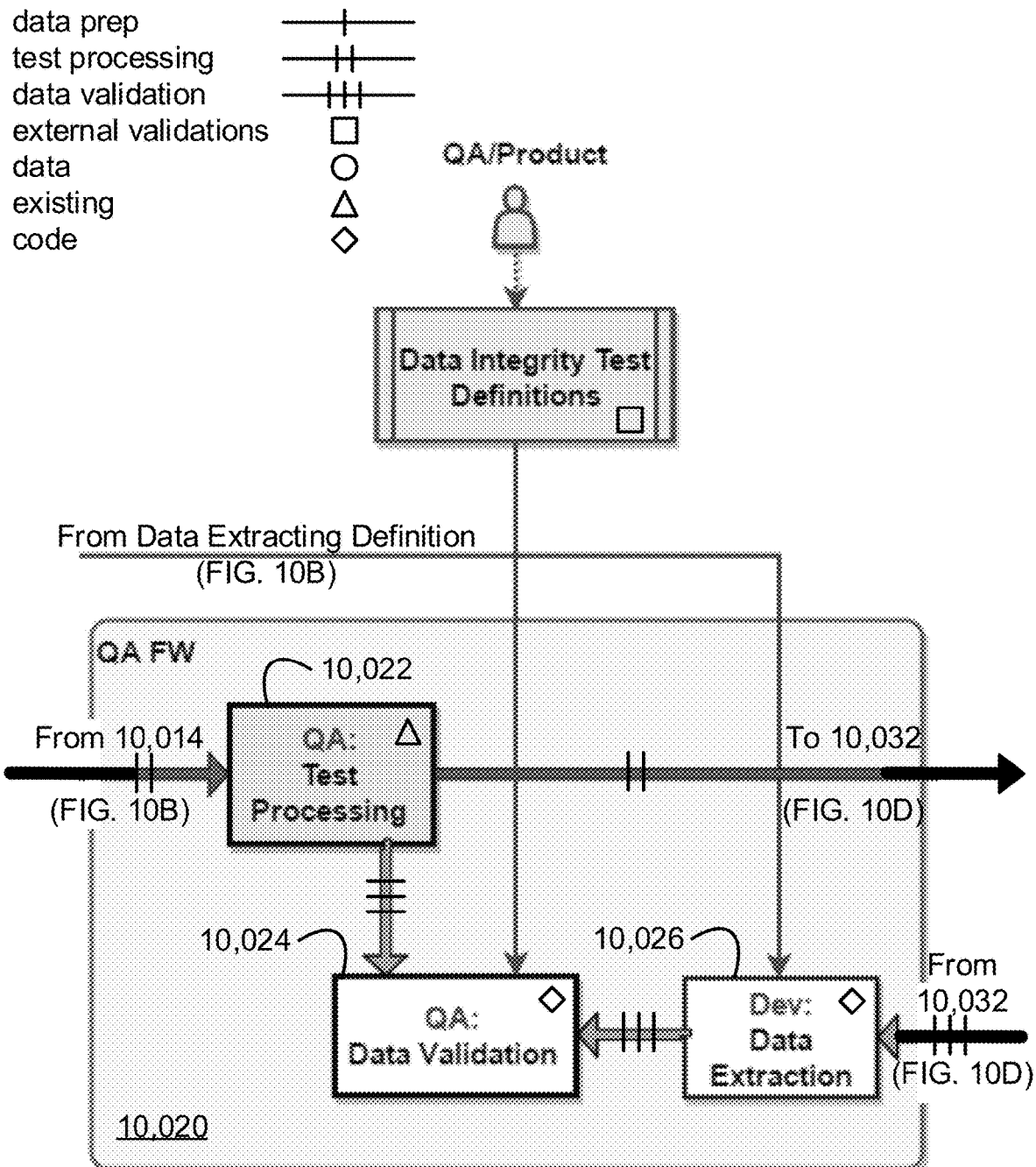
FIG. 10C illustrates a quality assurance framework of the integrity-and-volume testing system in accordance with some embodiments.
Figure 10D:
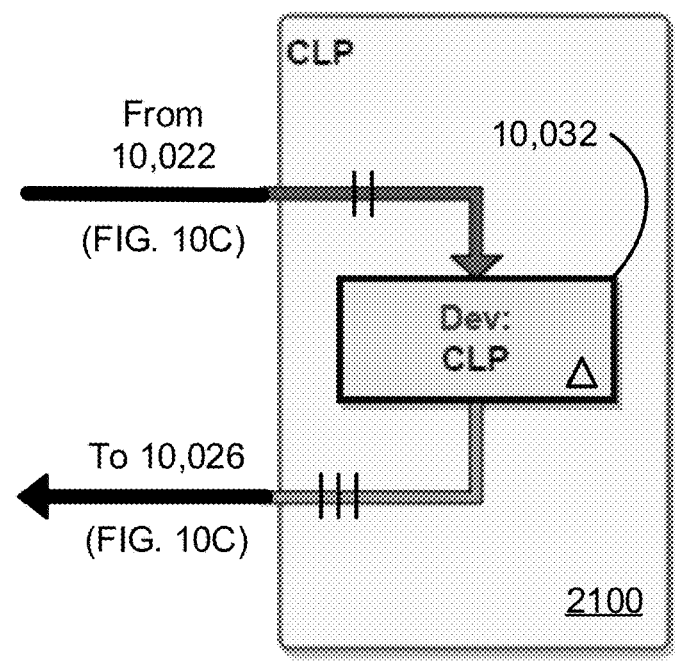
FIG. 10D illustrates a development version of the unsecured loan-lending system coupled to the integrity-and-volume testing system in accordance with some embodiments.

FIG. 10A illustrates an integrity-and-volume testing system 10,000 coupled to an unsecured loan-lending system 2100 in accordance with some embodiments. FIG. 10B illustrates a data preparation module 10,010 of the integrity-and-volume testing system 10,000 in accordance with some embodiments. FIG. 10C illustrates a quality-assurance framework 10,020 of the integrity-and-volume testing system 10,000 in accordance with some embodiments. FIG. 10D illustrates a development version 10,032 of the unsecured loan-lending system 2100 coupled to the integrity-and-volume testing system 10,000 in accordance with some embodiments.

As shown, the integrity-and-volume testing system 10,000 includes the data-preparation module 10,010, the quality-assurance framework 10,020, and the development version 10,032 of the unsecured loan-lending system 2100. The integrity-and-volume testing system 10,000 confirms all data gathered for processing unsecured loans is correctly gathered. For example, the integrity-and-volume testing system 10,000 confirms the data gathered is not deleteriously modified or lost during application processing. In addition, the integrity-and-volume testing system 10,000 confirms the data gathered and subsequently processed in the application processing is presented correctly in the unsecured loan-lending system 2100 including components thereof (e.g., one or more database, rules engines, etc.).

The data-preparation module 10,010 is configured to prepare sample loan-application input values for borrower-related information 10,002. The sample loan-application input values can be up to at least 32K sample loan-application input values, which input values can include input value corresponding borrowers, lender representatives, and third-party data (e.g., credit reports, etc.). The data-preparation module 10,010 includes a data-scrubbing module 10,012 configured to scrub at least the borrower-related information 10,002 of the sample loan-application input values. Data scrubbing with the data-scrubbing module 10,012 includes modifying or removing borrower-related information that is incorrect, incomplete, improperly formatted, or duplicated to produce scrubbed input data 10,014.

The quality-assurance framework 10,020 is configured to generate sample loan applications from the sample loan-application input values, or the scrubbed input data 10,014 therefrom, as well as validate processed sample loan applications against processed-as-expected loan applications. The processed-as-expected loan applications can include sample loan applications from the sample loan-application input values, or the like, processed through an existing version of the unsecured loan-lending system 2100 as opposed to the development version 10,032 of the unsecured loan-lending system 2100. The quality-assurance framework 10,020 includes a test-processing module 10,022, a validation module 10,024, and a data-extraction module 10,026. The quality-assurance framework 10,020 can further include a validation-report module 11,028. (See FIGS. 11A and 11C.) The test-processing module 10,022 is configured to generate the sample loan applications from the sample loan-application input values or the scrubbed input data 10,014 therefrom. The validation module 10,024 is configured to validate the processed sample loan applications against the processed-as-expected loan applications. When present, the validation-report module 11,028 is configured to provide validation reports for the processed sample loan applications validated against the processed-as-expected loan applications. For example, results of queries designed to compare data fields, rules engine responses, and the like can be provided in the validation reports to verify the processed sample loan applications match the processed-as-expected loan applications.

The development version 10,032 of the unsecured loan-lending system 2100 is configured to process the sample loan applications into the processed sample loan applications for validation against the processed-as-expected loan applications.

Figure 11A:
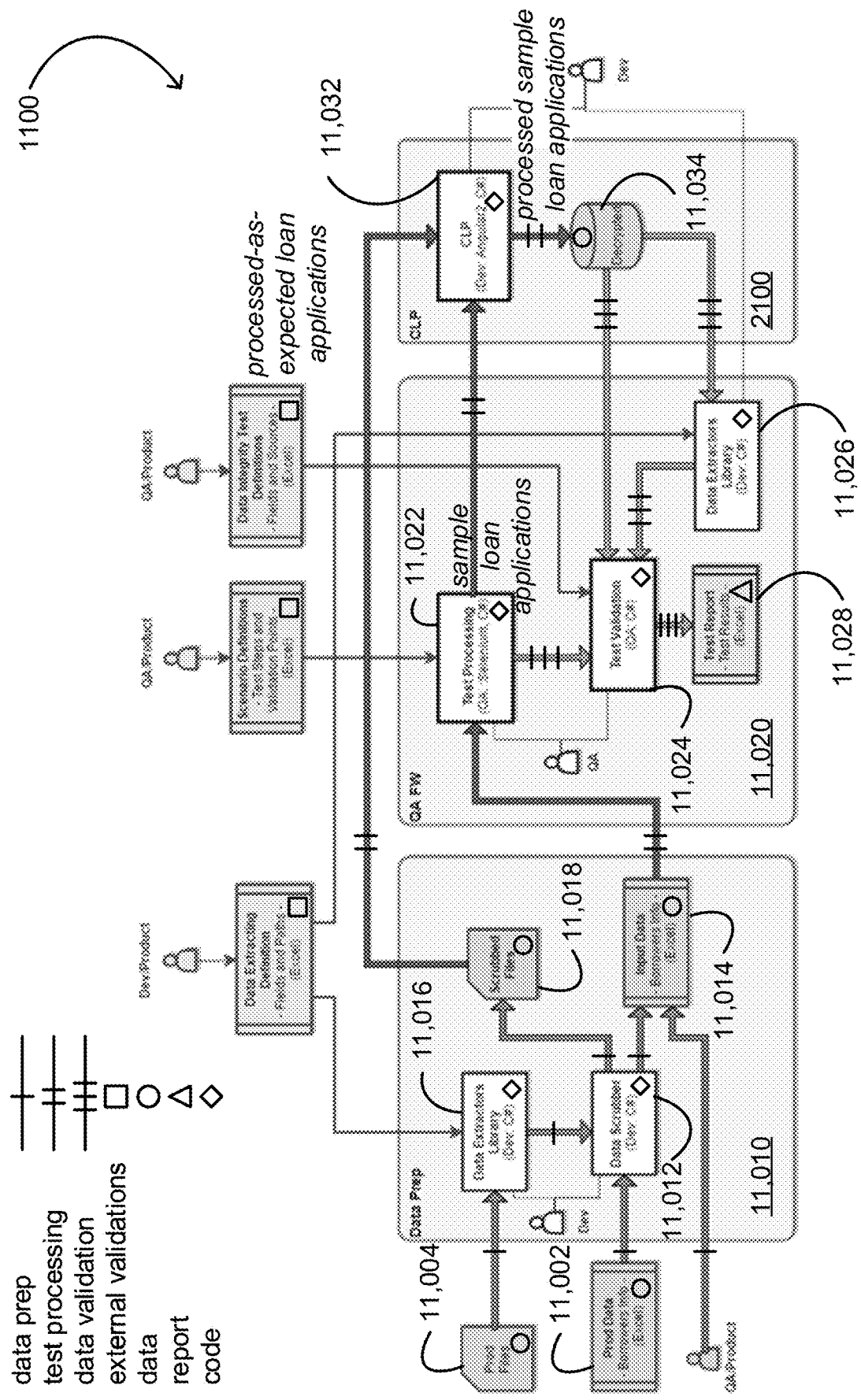
FIG. 11A illustrates an integrity-and-volume testing system coupled to an unsecured-loan lending system in accordance with some embodiments.
Figure 11B:
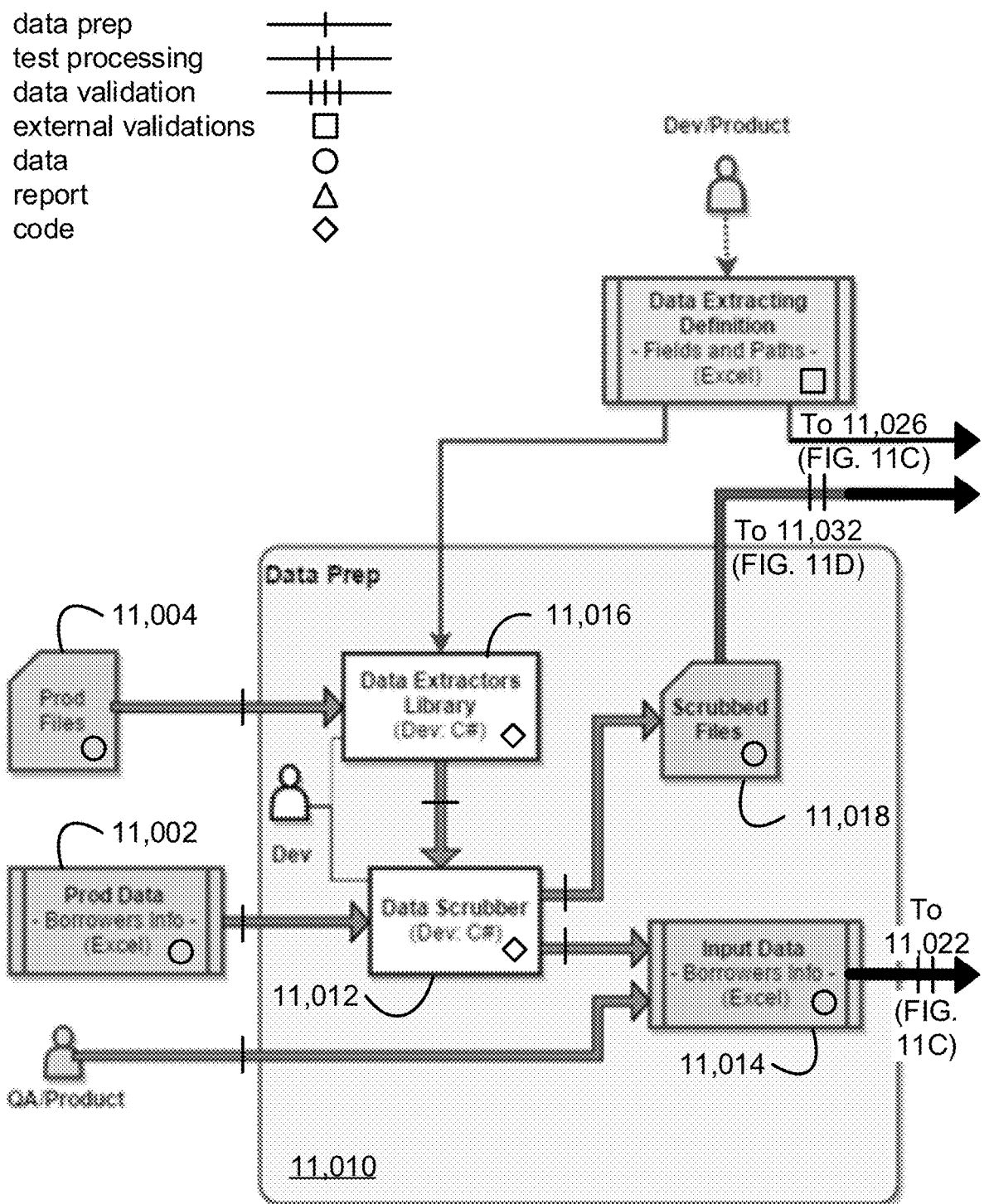
FIG. 11B illustrates a data preparation module of the integrity-and-volume testing system in accordance with some embodiments.
Figure 11C:
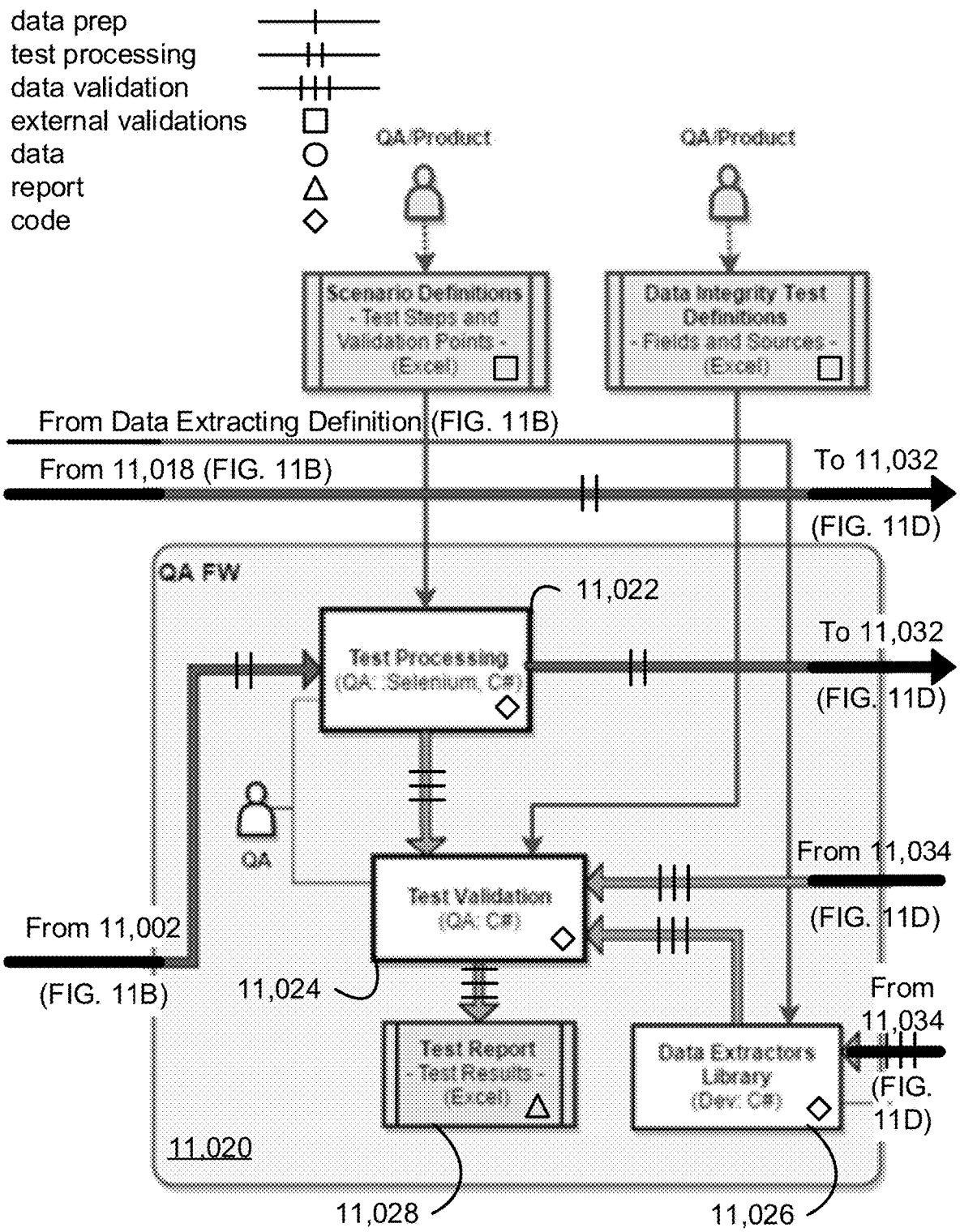
FIG. 11C illustrates a quality assurance framework of the integrity-and-volume testing system in accordance with some embodiments.
Figure 11D:
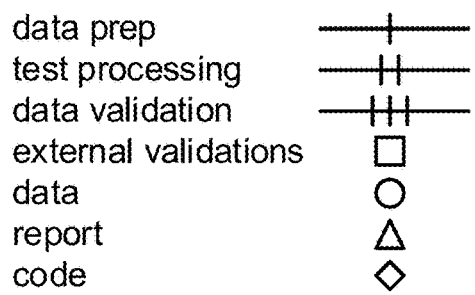
FIG. 11D illustrates a development version of the unsecured loan-lending system coupled to the integrity-and-volume testing system in accordance with some embodiments.
Figure 11D:
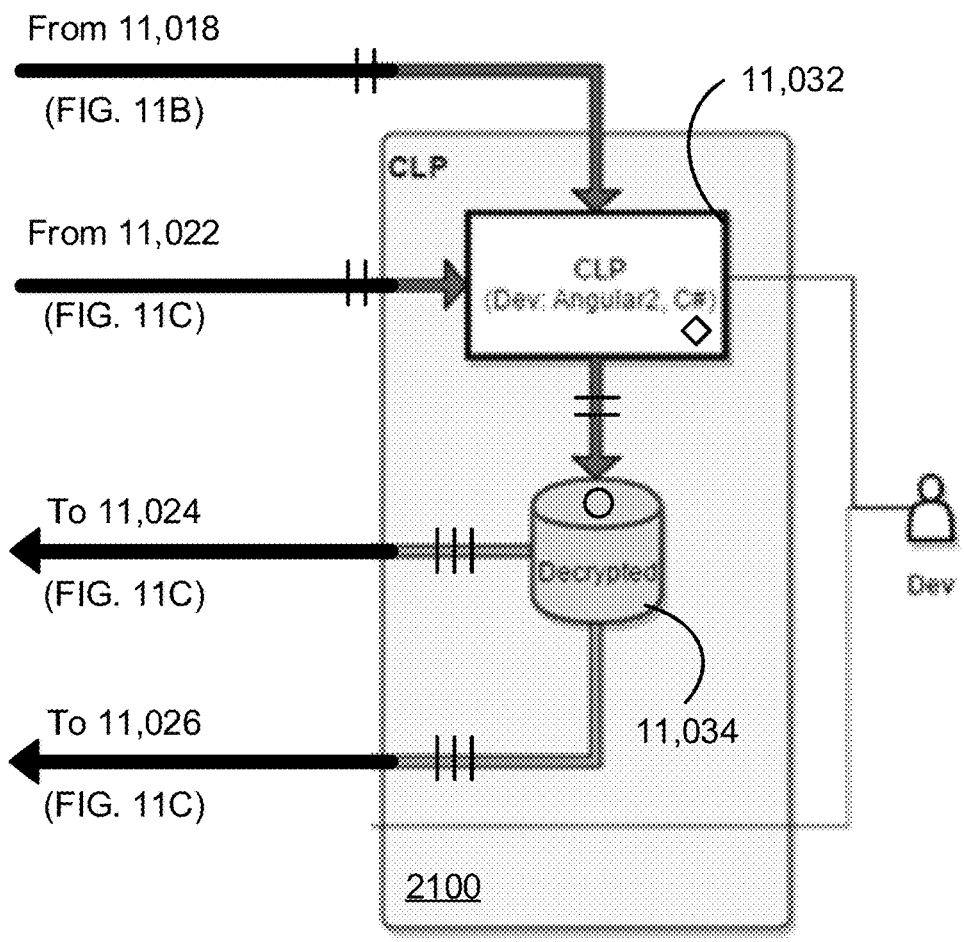

FIG. 11A illustrates an integrity-and-volume testing system 11,000 coupled to the unsecured-loan lending system 2100 in accordance with some embodiments. FIG. 11B illustrates a data preparation module 11,010 of the integrity-and-volume testing system 11,000 in accordance with some embodiments. FIG. 11C illustrates a quality-assurance framework 11,020 of the integrity-and-volume testing system 11,000 in accordance with some embodiments. FIG. 11D illustrates a development version 11,032 of the unsecured loan-lending system 2100 coupled to the integrity-and-volume testing system 11,000 in accordance with some embodiments.

As shown, the integrity-and-volume testing system 11,000 includes the data-preparation module 11,010, the quality-assurance framework 11,020, and the development version 11,032 of the unsecured loan-lending system 2100. Like the integrity-and-volume testing system 10,000, the integrity-and-volume testing system 11,000 confirms all data gathered for processing unsecured loans is correctly gathered.

The data-preparation module 11,010 is configured to prepare sample loan-application input values for borrower-related information 11,002 and loan-product information 11,004. The sample loan-application input values can be up to at least 32K sample loan-application input values, which input values can include input value corresponding borrowers, lender representatives, and third-party data (e.g., credit reports, etc.). The data-preparation module 11,010 includes a data-extraction module 11,016 having a data-extraction library, wherein the data-extraction module 11,016 is configured to extract loan-product data from the loan-product information 11,004 of the sample loan-application input values. The data-preparation module 11,010 includes a data-scrubbing module 11,012 configured to scrub the borrower-related information 11,002 of the sample loan-application input values and the loan-product data extracted from the loan-product information 11,004 of the sample loan-application input values. Data scrubbing with the data-scrubbing module 11,012 includes modifying or removing borrower-related information, loan-product data, or the borrower-related information and the loan-product data that is incorrect, incomplete, improperly formatted, or duplicated to produce at least scrubbed input data 11,014 and scrubbed files 11,018.

The quality-assurance framework 11,020 is configured to generate sample loan applications from the sample loan-application input values, or the scrubbed input data 11,014 therefrom, as well as validate processed sample loan applications against processed-as-expected loan applications. The processed-as-expected loan applications can include sample loan applications from the sample loan-application input values, or the like, processed through an existing version of the unsecured loan-lending system 2100 as opposed to the development version 11,032 of the unsecured loan-lending system 2100. The quality-assurance framework 11,020 includes a test-processing module 11,022, a validation module 11,024, a data-extraction module 11,026, and a validation-report module 11,028. The test-processing module 11,022 is configured to generate the sample loan applications from the sample loan-application input values, or the scrubbed input data 11,014 therefrom. The data-extraction module 11,026 has a data-extraction library, wherein the data-extraction module 11,026 is configured to extract loan-application data from the processed sample loan applications upon decryption thereof for validation by the validation module 11,024. The validation module 11,024 is configured to validate the processed sample loan applications, or the loan-application data extracted therefrom, against the processed-as-expected loan applications. The validation-report module 11,028 is configured to provide validation reports for the processed sample loan applications, or the loan-application data extracted therefrom, validated against the processed-as-expected loan applications. For example, results of queries designed to compare data fields, rules engine responses, and the like can be provided in the validation reports to verify the processed sample loan applications match the processed-as-expected loan applications.

The development version 11,032 of the unsecured loan-lending system 2100 is configured to process the sample loan applications into the processed sample loan applications for validation against the processed-as-expected loan applications. In accordance with security features of the unsecured loan-lending system 2100, the sample loan applications are encrypted during the processing thereof. As such, the unsecured loan-lending system 2100 includes a decryption module 11,034 configured to decrypt the processed sample loan applications for subsequently extracting the loan-application data from the processed sample loan applications by the data-extraction module 11,026 of the quality-assurance framework 11,020.

Methods

Non-transitory CRM can include executable instructions that, when executed on one or more server hosts such as the server hosts 6010, 6020, 6030, and 6040 of FIG. 6 by at least an equal number of processors, cause the one or more server hosts to instantiate the unsecured loan-lending system 2100 configured to perform a number of operations of the unsecured loan-lending system 2100.

The operations include instantiating the unsecured loan-originating application stack of the unsecured loan-originating system 3400 for originating unsecured loans, instantiating the unsecured loan-servicing application stack of the unsecured loan-servicing system 5500 for servicing the unsecured loans, and providing third-party integration 3500 supporting the originating or the servicing of the unsecured loans. The third-party integration 3500 includes one or more APIs configured for transferring loan-related information between the unsecured loan-lending system 2100 and third parties.

The operations further include operating the unsecured loan-originating application stack at least in part in a primary memory of at least one server host of the one or more server hosts 6010, 6020, 6030, and 6040. The unsecured loan-originating application stack includes a web server, an application server, a database server, and an e-mail server.

The operations further include operating the unsecured loan-servicing application stack at least in part in a same primary memory of the at least one server host or a different primary memory of at least one other server host of the one or more server hosts 6010, 6020, 6030, and 6040. The unsecured loan-servicing application stack includes a web server, an application server, a database server, and an e-mail server.

The operations further include providing at least a mobile web application by way of the application server. The mobile web application is configured to operate at least in part in a primary memory of a mobile device and present the borrower GUI 4000 within a mobile web browser on a touchscreen of a display of the mobile device. The borrower GUI 4000 is configured to allow potential borrowers to enter borrower-related information into a number of borrower-fillable sections of a digital application.

The operations further include providing at least a web application by way of the application server. The web application is configured to operate at least in part in a primary memory of a personal computer and present the lender GUI 3540 within a web browser on a screen of a monitor associated with the personal computer. The lender GUI 3540 is configured to allow a representative of the lender to review the borrower-related information entered in the number of sections of the digital application.

The operations further include sending secured e-mail messages through the lender GUI 3540 by way of the e-mail server. The lender GUI 3540 is configured to allow the representative of the lender to send the secured e-mail messages with automatic e-mail headers and attachments determined in accordance with a focus in the lender GUI 3540 on a particular borrower and loan process step.

The operations further include transferring to the database server and storing in a database on a storage device of the at least one server host of the one or more server hosts 6010, 6020, 6030, and 6040 borrower-related information held in the number of sections of the digital application. The number of sections of the digital application for the unsecured loan include a borrower-account registration section, a loan-purpose section, a borrower-profile section, an income-information section, an employment-history section, a banking-information section, or a combination thereof.

The operations further include automatically underwriting with the automatic underwriting module 3570 of the unsecured loan-originating application stack. The automatic underwriting module 3570 is configured to perform detailed risk assessments in view of the borrower-related information transferred to the database server and stored in the database on the storage device of the at least one server host of the one or more server hosts 6010, 6020, 6030, and 6040.

The operations further include providing a servlet configured to allow the potential borrowers to upload electronic copies or images of documents selected from at least driver's licenses, pay stubs, and bank statements. Each section of the number of sections of the digital application optionally includes a graphical element configured to activate the servlet upon activation of the graphical element by a potential borrower and upload the electronic copes or images of documents.

The operations further include recognizing text in uploaded images of documents with the OCR module 3560 of the unsecured loan-originating application stack, extracting text from the uploaded images of documents with the OCR module 3560, and providing the text by way of the web server for automated filling of the borrower-related information.

The operations further include automatically depositing unsecured-loan funds by way of the unsecured loan-originating system 3400. The borrower-related information from the banking information section transferred to the database server and stored in the database on the storage device of the at least one server host of the one or more server hosts 6010, 6020, 6030, and 6040 is used for automatically depositing the unsecured-loan funds.

The operations further include automatically setting up monthly ACH payments by way of the unsecured loan-originating system 3400 on unsecured loans in accordance with terms of the unsecured loans. The borrower-related information from the banking information section transferred to the database server and stored in the database on the storage device of the at least one server host of the one or more server hosts 6010, 6020, 6030, and 6040 is used for automatically setting up the monthly ACH payments.

Non-transitory CRM can further include executable instructions that, when executed on one or more server hosts such as the server hosts 6010, 6020, 6030, and 6040 of FIG. 6 by at least an equal number of processors, cause the one or more server hosts to instantiate the integrity-and-volume testing system 10,000, 11,000 configured to perform a number of operations of the integrity-and-volume testing system 10,000, 11,000.

The operations include preparing sample loan-application input values for borrower-related information and loan-product information with the data-preparation module 10,010, 11,010 of the integrity-and-volume testing system 10,000, 11,000; generating sample loan applications from the sample loan-application input values with a quality-assurance framework 10,020, 11,020 of the integrity-and-volume testing system 10,000, 11,000; processing the sample loan applications into processed sample loan applications with a development version 10,032, 11,032 of the unsecured loan-lending system 2100; and validating with the quality-assurance framework 10,020, 11,020 the processed sample loan applications against processed-as-expected loan applications generated from the sample loan-application input values.

The operations include scrubbing at least the borrower-related information of the sample loan-application input values with the data-scrubbing module 10,012, 11,012 of the data-preparation module 10,010, 11,010.

The operations include generating the sample loan applications from the sample loan-application input values with the test-processing module 10,022, 11,022 of the quality-assurance framework 10,020, 11,020.

The operations include validating the processed sample loan applications against the processed-as-expected loan applications with the validation module 10,024, 11,024 of the quality-assurance framework 10,020, 11,020.

The operations include providing validation reports for the processed sample loan applications validated against the processed-as-expected loan applications with a validation-report module 11,028 of the quality-assurance framework 11,000.

The concepts provided herein including the particular embodiments thereof represent a technological advancement in lending and servicing, particularly lending and servicing with respect to unsecured loans. The unsecured loan-lending system 2100 incorporates computer-related technology for tight integration including information sharing between the unsecured loan-originating system 3400 and the unsecured loan-servicing system 5500 in order to provide such a technological advancement. At least one example is using borrower-related information for a bank account, or the linked bank account itself, to automatically deposit unsecured-loan funds in the bank account as well as automatically set up monthly ACH payments to pay down the unsecured loan.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. An integrity-and-volume testing system for an unsecured loan-lending system, comprising:
    a web application configured to run at least in part from a primary memory of a device and present a lender graphical user interface ("GUI") within a web browser on a display of the device, the lender GUI configured to allow a representative of the lender to review borrower information in one or more digital mortgage applications of one or more borrowers;
    a digital mortgage application stack configured to run at least in part from a primary memory of at least one server host, the digital mortgage application stack including a web server, a digital mortgage application server, and a database server, wherein:
    sample loan-application input values for borrower-related information and loan-product information are prepared using a data-preparation module that includes a data-extraction module comprising a data-extraction library;
    a quality-assurance framework is configured to generate sample loan applications from the sample loan-application input values and validate processed sample loan applications against processed-as-expected loan applications;
    wherein the memory comprises a rule engine configured to:
    implement one or more configurations with respect to one of a borrower interface and a lender interface;
    implement first decisioning rules corresponding to one or more credit criteria of a loan applicant for an unsecured loan-lending system;
    implement second decisioning rules corresponding to one or more loan pricing criteria for a secured loan-lending system; and
    confirm that data gathered is not modified or lost during application processing, and that the gathered data is presented correctly in at least one of the decisioning rules engines;
    a data-scrubbing module configured to scrub the borrower-related information of the sample loan-application input values and loan-product data extracted from the loan-product information;
    wherein data scrubbing with the data-scrubbing module comprises modifying borrower-related information and generating scrubbed input data and one or more scrubbed files; and
    wherein a development version of the unsecured loan-lending system is configured to process the sample loan applications into the processed sample loan applications for validation against the processed-as-expected loan applications.

2. The system of claim 1, wherein the quality-assurance framework generates the sample loan applications from the sample loan-application input values.

3. The system of claim 1, wherein the quality-assurance framework validates the processed sample loan applications against the processed-as-expected loan applications.

4. The system of claim 1, wherein the quality-assurance framework to provides validation reports for the processed sample loan applications validated against the processed-as-expected loan applications.

5. A computer-implemented method of an integrity-and-volume testing system for an unsecured loan-lending system, comprising:
    a web application configured to run at least in part from a primary memory of a device and present a lender graphical user interface ("GUI") within a web browser on a display of the device, the lender GUI configured to allow a representative of the lender to review borrower information in one or more digital mortgage applications of one or more borrowers;
    a digital mortgage application stack configured to run at least in part from a primary memory of at least one server host, the digital mortgage application stack including a web server, a digital mortgage application server, and a database server, wherein:
    preparing sample loan-application input values for borrower-related information and loan-product information with a data-preparation module;
    generating sample loan applications from the sample loan-application input values with a quality-assurance framework of the integrity-and-volume testing system;
    processing the sample loan applications into processed sample loan applications with a development version of the unsecured loan-lending system;
    utilizing a rules engine to implement one or more configurations of the unsecured loan-lending system, the rules engine comprising logic configured to:
        implement first decisioning rules corresponding to one or more credit criteria of a loan applicant for an unsecured loan-lending system;
        implement second decisioning rules corresponding to one or more loan pricing criteria for a secured loan-lending system;
    a data-scrubbing module configured to:
        scrub the borrower-related information of the sample loan-application input values and loan-product data extracted from the loan-product information;
        wherein data scrubbing with the data-scrubbing module comprises modifying borrower-related information; and
        generate scrubbed input data and one or more scrubbed files; and
    validating with the quality-assurance framework the processed sample loan applications against processed-as-expected loan applications generated from the sample loan-application input values.

6. The method of claim 5, further comprising:
generating the sample loan applications from the sample loan-application input values with a test-processing module of the quality-assurance framework.

7. The method of claim 5, further comprising:
validating the processed sample loan applications against the processed-as-expected loan applications with a validation module of the quality-assurance framework.

8. The method of claim 5, further comprising:
providing validation reports for the processed sample loan applications validated against the processed-as-expected loan applications with a validation-report module of the quality-assurance framework.

* * * * *